United States Patent [19]
Moroto et al.

[11] Patent Number: 5,690,576
[45] Date of Patent: Nov. 25, 1997

[54] CONTINUOUSLY VARIABLE TRANSMISSION WITH CONTROL OF SWITCHING BETWEEN FORWARD AND REVERSE

[75] Inventors: Shuzo Moroto, Nagoya; Takao Taniguchi; Shoichi Miyagawa, both of Okazaki; Shiro Sakakibara, Anjo; Kazumasa Tsukamoto, Toyota; Takeshi Inuzuka; Masashi Hattori, both of Anjo, all of Japan

[73] Assignee: Aisin AW Co., Ltd., Japan

[21] Appl. No.: 620,226

[22] Filed: Mar. 22, 1996

[30] Foreign Application Priority Data

| Mar. 24, 1995 | [JP] | Japan | 7-066234 |
| May 26, 1995 | [JP] | Japan | 7-128701 |
| May 26, 1995 | [JP] | Japan | 7-128702 |

[51] Int. Cl.$^6$ ........................ F16H 9/26
[52] U.S. Cl. ........................ 475/211
[58] Field of Search ........................ 475/211, 212

[56] References Cited

U.S. PATENT DOCUMENTS

| 3,340,749 | 9/1967 | Magg et al. | 475/211 |
| 3,375,734 | 4/1968 | Lemons | 475/211 |
| 3,385,132 | 5/1968 | Browning | 475/211 |
| 3,479,908 | 11/1969 | Kress et al. | 475/211 |
| 4,290,320 | 9/1981 | Abbott | 74/689 |
| 4,402,237 | 9/1983 | Tomlinson | 74/689 |
| 4,553,450 | 11/1985 | Gizard | 74/689 |
| 4,644,820 | 2/1987 | Macey et al. | 475/211 |
| 5,045,028 | 9/1991 | Rattunde et al. | 475/211 |

FOREIGN PATENT DOCUMENTS

| 56-49456 | 5/1981 | Japan. |
| 56-52653 | 5/1981 | Japan. |
| 56-110954 | 6/1984 | Japan. |
| 6331000 | 11/1994 | Japan. |

*Primary Examiner*—Dirk Wright
*Attorney, Agent, or Firm*—Lorusso & Loud

[57] ABSTRACT

A continuously variable transmission system includes a belt type continuously variable transmission unit which, in turn, is composed of a primary pulley and a secondary pulley wherein the torque transmitting direction is switched by torque circulation in changeover between forward and reverse travel. When a low mode is selected in a D range, a somewhat higher hydraulic pressure from a regulator valve is supplied, through a manual valve, to a secondary hydraulic servo, which moves one sheave of the secondary pulley, and a somewhat lower hydraulic pressure from a ratio control valve is supplied to a primary hydraulic servo which moves one sheave of the primary pulley. When the D range is switched to R range by the manual valve, the supplies of the above hydraulic pressures are reversed. With this arrangement, the relative axial forces on the pulleys are changed in switching between forward and reverse travel.

10 Claims, 24 Drawing Sheets

| Elements<br>Manual Position | Primary Hydraulic Servo 32 | | Secondary Hydraulic Servo 33 | | C_L | C_H |
|---|---|---|---|---|---|---|
| | 1st Hydraulic Chamber 45 | 2nd Hydraulic Chamber 47 | 1st Hydraulic Chamber 46 | 2nd Hydraulic Chamber 49 | | |
| P | ○ | | ○ | | ○ | |
| R | ○ | ○ | ○ | | | |
| N | ○ | | ○ | | | |
| D  L | ○ | | ○ | ○ | ○ | |
| D  H | ○ | ○ | ○ | | | ○ |

*FIG. 8*

| Elements / Manual Position | Primary Hydraulic Servo 32 | | Secondary Hydraulic Servo 33 | | $C_L$ | $C_H$ |
|---|---|---|---|---|---|---|
| | $P_L-L(57)$ | $P_L-H(56)$ | $P_L-L(57)$ | $P_L-H(56)$ | | |
| P | ○ | | ○ | | | |
| R | | ○ | ○ | | ○ | |
| N | ○ | | ○ | | | |
| D  L | ○ | | | ○ | ○ | |
| D  H | | ○ | ○ | | | ○ |

FIG. 13

FIG. 25(a)
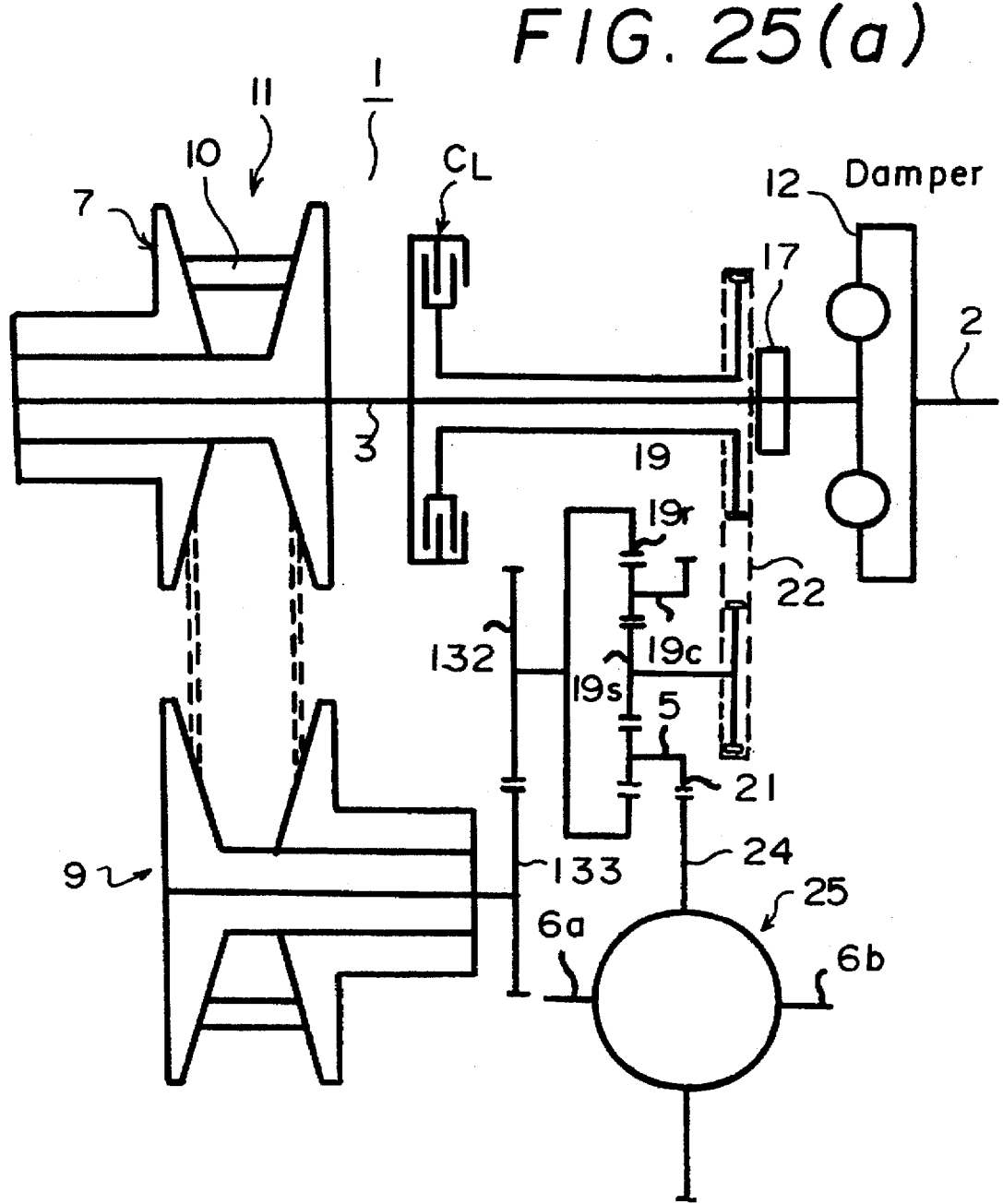
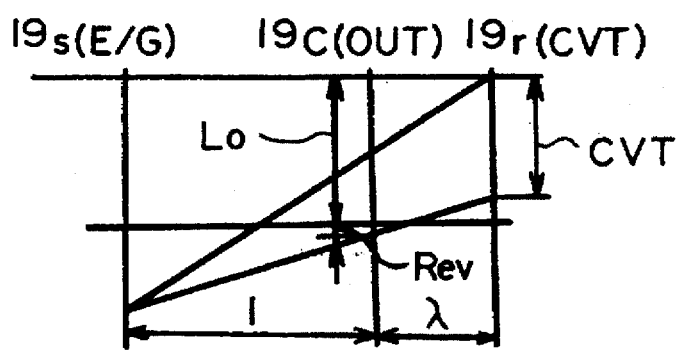
FIG. 25(b)

CONTINUOUSLY VARIABLE TRANSMISSION WITH CONTROL OF SWITCHING BETWEEN FORWARD AND REVERSE

BACKGROUND OF THE INVENTION

1. Field of the Invention

The present invention relates to a continuously variable transmission system including a planetary gear unit and a belt type continuously variable transmission unit composed of a primary pulley and a secondary pulley, and a belt trained around the primary and secondary pulleys, and more specifically, to control of the axial forces of the belt type continuously variable transmission in transition between forward and reverse travel.

2. Prior Art

Automatic continuously variable transmission systems having a belt type continuously variable transmission (hereinafter "CVT") has attracted attention as a possible answer to requirements for improved fuel efficiency, driving performance, and the like.

Japanese Patent Application Laid-Open No. 56-52653, discloses a continuously variable transmission system having a planetary gear train capable of changing speed in the two stages of directly-coupled rotation and forward speed reducing rotation, a CVT and a planetary gear unit for combining the torques output from the planetary gear train and from the CVT and outputting the combined torque, with continuous speed change in forward and in reverse direction by the combination of the two-stage speed change effected by the planetary gear train and the continuously variable speed change effected by the CVT. When the shift lever is set to the D position, the result is speed reducing forward rotation of the planetary gear train. This speed reducing forward rotation is coupled with the speed changing rotation of the CVT and output from the planetary gear unit as a forward continuously variable rotation. When the shift lever is set to the R position, the result is directly-coupled rotation of the planetary gear train. This directly-coupled rotation is coupled with the rotation of the CVT and output from the planetary gear unit as a reverse continuously variable rotation. The direction in which power is transmitted by the CVT, that is, the driving/driven relationship between the primary pulley and the secondary pulley is switched between forward (D position) and reverse (R position) travel by torque circulation.

In general, the CVT changes its pulley ratio to thereby change speed by changing axial forces (belt holding pressures) acting on both driving and driven side pulleys. Although the ratio of axial forces acting on both the pulleys must be set to a predetermined value to transmit power by setting both the pulleys to a predetermined pulley ratio, the axial force on the driving side pulley must be made larger than that on the driven side pulley.

In the continuously variable transmission system, however, since the axial forces on the pulleys are not taken into consideration, regardless of the power transmission direction of the CVT, speed change control in switching forward and reverse travel suffers in several aspects in that time is consumed before the speed changing control becomes stabilized and, thus, there is the possibility that response may be delayed.

SUMMARY OF THE INVENTION

Accordingly, an object of the present invention is to provide a continuously variable transmission system capable of solving the above-described problems by controlling the axial forces acting on both pulleys of the CVT.

The present invention provides a continuously variable transmission system including an input shaft associated with an engine output shaft, an output shaft for driving the vehicle wheels, a CVT having a first pulley associated with the input shaft, a second pulley, a belt trained around both the pulleys and an axial force actuating means for applying axial forces to both pulleys for changing the pulley ratio, a planetary gear unit having at least first, second and third rotary elements, with the first rotary element rotating with the input shaft, the second rotary element rotating with the second pulley and the third rotary element rotating with the output shaft, respectively. Selection means is provided for selecting between a forward traveling state and a reverse traveling state, wherein the torque transmitting direction is changed between the first and second pulleys of the CVT and the direction of torque output from the output shaft is thereby switched between a forward traveling state and the backward traveling state by the selection means. The continuously variable transmission system includes a control means for controlling the axial force actuating means so that axial forces acting on the first and second pulleys differ by an amount corresponding to the pulley ratio. A switching means serves to reverse the relative magnitudes of the axial forces acting on the first and second pulleys. When the travel direction of the vehicle is switched between forward and reverse, the switching means switches the relative relationship of the magnitudes of the axial forces acting on the pulleys so as to coincide the new torque transmission direction, reversed by torque circulation, so that travel can be securely and promptly switched, between forward and reverse.

The axial force actuating means may include a first hydraulic servo acting on the first pulley and a second hydraulic servo acting on the second pulley for application of axial forces to the first and second pulleys by supplying hydraulic pressures to the first and second hydraulic servos from an oil pump, and the switching means may be a switching valve for switching the hydraulic pressure acting on the first hydraulic servo and the hydraulic pressure acting on the second hydraulic servo. Since the hydraulic pressures acting on the first and second hydraulic servos are reversed by the switching valve, the hydraulic pressures of both the hydraulic servos need not be individually controlled, so that forward travel and reverse travel can be simply and promptly switched by the changing of feed paths by the switching valve.

The switching valve may be a manual valve integral with the selection means. Since the switching valve is the manual valve, a driver can reliably switch between forward and reverse in accordance with his intention.

In a preferred embodiment, each of the above first and second hydraulic servos has a plurality of hydraulic chambers and the switching valve selectively switches the hydraulic pressures supplied to the hydraulic chambers to thereby reverse the effective pressure receiving areas of the first and second hydraulic servos, as shown in, for example, FIG. 4 to FIG. 8 and FIG. 14. Since each of the first and second hydraulic servos has a plurality of hydraulic chambers, switching between forward and reverse is easy and secure, effected by reversing the hydraulic pressures supplied to the hydraulic chambers without need for regulating the hydraulic pressures acting on the hydraulic servos.

The first and second hydraulic servos may have first and second hydraulic chambers with the first hydraulic chambers of both the hydraulic servos having the same effective pressure-receiving areas. A controller includes a regulator valve and a ratio control valve, wherein the hydraulic pressure from the regulator valve is supplied to the first hydraulic chambers of both of the hydraulic servos at all times, the hydraulic pressure from the ratio control valve is supplied to the second hydraulic chamber of one of the two hydraulic servos, and the switching valve reverses the communication of the ratio control valve between the second hydraulic chambers of the two hydraulic servos. Since hydraulic pressures are supplied to the first hydraulic chambers of both hydraulic servos at all times and a hydraulic pressure is supplied to the second hydraulic chamber of a selected one of the hydraulic servos, the direction of travel can be easily and securely switched between forward and reverse.

The regulator valve and the ratio control valve may be interposed between the oil pump and the switching valve. When the regulator valve and the ratio control valve are disposed downstream of the switching valve, the number of valves must be increased or the functions of a single valve must be increased. However, when the regulator valve and the ratio control valve are interposed between the oil pump and the switching valve, such an increase is not needed and the arrangement can be simplified.

In another embodiment, the controller includes first and second regulator valves for adjusting the hydraulic pressure from the oil pump to provide the respective hydraulic pressures fed to the first and second hydraulic servos, with the switching valve reversing the communication of the first and second regulator valves with the first and second hydraulic servos as shown in, for example, FIG. 9 to FIG. 13 and FIG. 15. Since the two regulator valves regulate different hydraulic pressures, and the regulated hydraulic pressures are switched between the two hydraulic servos in switching between forward and reverse travel, the direction of travel can be securely and easily switched by reversing the axial forces acting on the pulleys. The first and second regulator valves may be interposed between the oil pump and the switching valve. Accordingly, the arrangement can be simplified without the need for an increase in the number of valves or an increase in the functions of a single valve.

A relief valve may be provided to reverse the relative magnitudes of the pressures fed to the hydraulic servos when the vehicle is in a state of coasting. Since the hydraulic pressure of the hydraulic servo at the higher hydraulic pressure is lowered by the relief valve, axial forces acting on the pulleys are changed so as to coincide with a change in torque transmitting direction even when the torque transmitting direction is reversed during coasting, thus allowing coasting to be securely maintained.

In a preferred embodiment, the input shaft is coupled to the first pulley and the first rotary element, so that the direction of torque transmission between the first pulley and the input shaft and the direction of torque transmission between the first rotary element and the input shaft are the reverse of each other, as shown in, for example, FIG. 1(c) and FIG. 24 to FIG. 26. In this manner, torque circulation is provided through the planetary gear unit.

According to the above arrangement, the engine output through the input shaft in one path is subjected to the speed changing operation of the CVT and then transmitted to the second rotary element of the planetary gear unit and in a second path, without speed change, is transmitted to the first rotary element. Both paths converge and their transmitted torques are combined in the planetary gear unit, with output from the third rotary element at the output shaft.

Then, the axial force actuating means, acting under control of the controller, changes the axial force acting on the first or second pulley, so that the pulley ratio of the CVT is changed to a predetermined pulley ratio thus changing the speed of the transmitted torque. Further, when a change between the forward traveling state and the reverse traveling state is dictated by the selection means, the direction of torque output from the output shaft is changed between forward and reverse rotation and the torque transmitting direction of the CVT is changed as well.

At the time of such a change, the relative relationship of the magnitudes of the axial forces acting on the above first and second pulleys is reversed by the switching means to coincide with the new direction of torque transmission.

BRIEF DESCRIPTION OF THE DRAWINGS

FIG. 1(c) is a diagram showing torque circulation within the embodiment of FIG. 1(a) operating in forward;

FIG. 8 is a table of operations of the hydraulic control unit of FIG. 5;

FIG. 13 is a table of operations of the hydraulic control unit of FIG. 10;

FIG. 25(a) is a skeletal diagram of a third embodiment of the transmission system of the present invention;

FIG. 25(b) is a speed graph for the third embodiment of FIG. 25(a); and

DESCRIPTION OF PREFERRED EMBODIMENTS

Embodiments of the present invention will be described below with reference to the drawings.

Figures 1A, 1B:
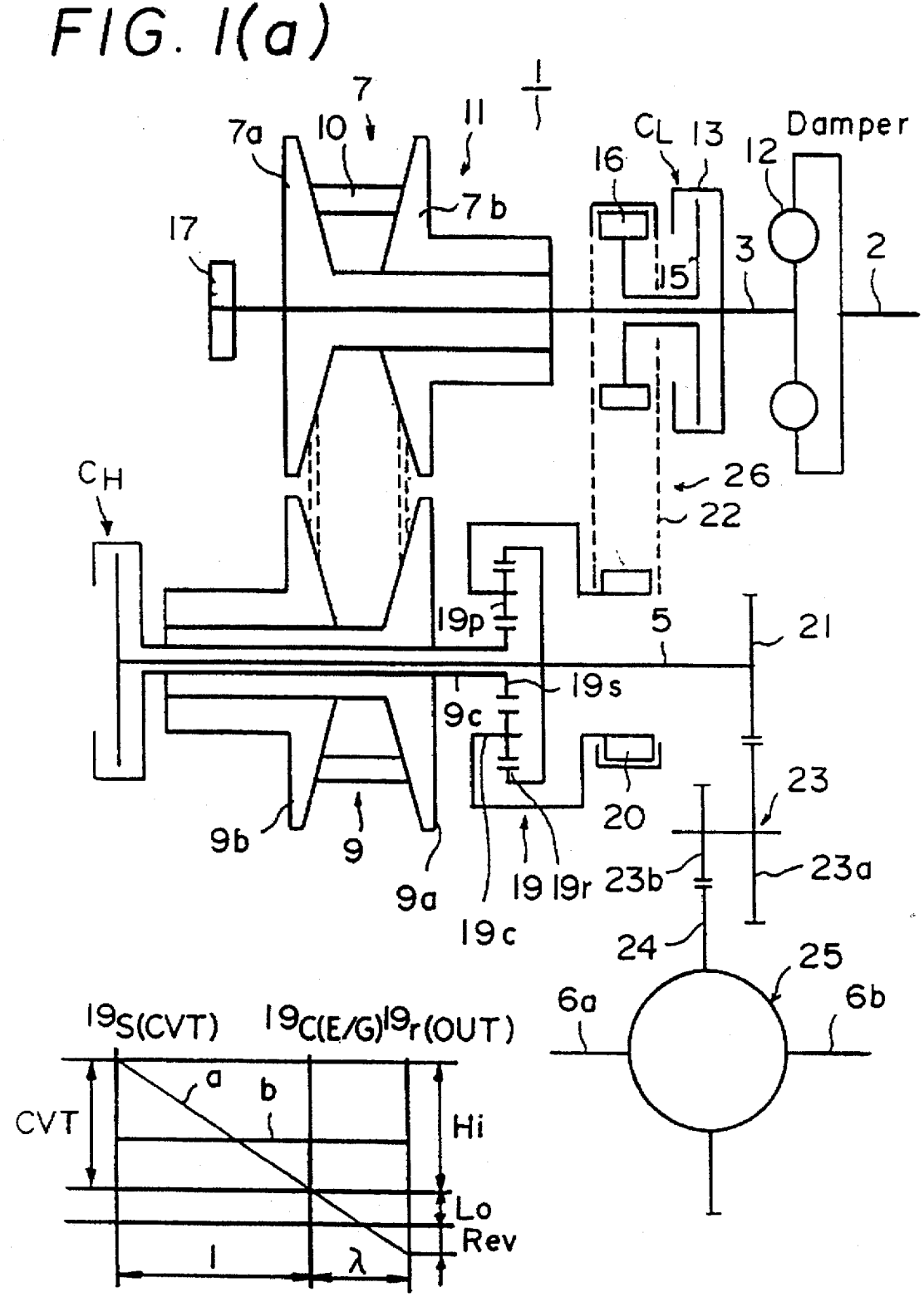
FIG. 1(a) is a skeletal diagram of an embodiment of a continuously variable transmission system according to the present invention.
FIG. 1(b) is a speed graph for the embodiment of FIG. 1(a)

In the first embodiment of the present invention shown in FIG. 1(a), a vehicle-mounted automatic continuously variable transmission 1 has a first shaft 3 aligned with an engine crank shaft 2, a second shaft 5 and a third shaft 6 (a, b) aligned with a front wheel shaft. A primary pulley 7 is supported by the input shaft 3, a secondary pulley 9 is supported by the second shaft 5 and a belt 10 is trained around these two pulleys 7, 9 to form a CVT.

The first shaft 3 is coupled to the engine crank shaft 2 through a damper 12 and thereby serves as an input shaft. The input side member 13 of a low clutch $C_L$ is fixed to the input shaft 3 and the output side member 15 of the low clutch $C_L$ is rotatably supported by the input shaft 3. Further, a primary side sprocket 16, constituting a power transmission means, is integrally coupled with the output side member 15. In addition, the stationary sheave 7a of the primary pulley 7 is fixed to the input shaft 3 and an oil pump 17 is mounted on the distal end of the input shaft 3. The movable sheave 7b is slidably supported by the fixed sheave 7a.

The secondary pulley 9 is rotatably supported by the second shaft 5 and has a stationary sheave 9a, a movable sheave 9b slidably supported by the stationary sheave and a secondary shaft 9c integrally coupled to the stationary sheave. Further, a high clutch $C_H$ is interposed between the second shaft 5 and the secondary shaft 9c, a planetary gear unit 19 is mounted on the second shaft 5 and a secondary side sprocket 20 is rotatably supported by the output shaft 5. The output shaft 5 has an output gear 21 fixed at an end thereof.

The planetary gear unit 19 has a sun gear 19s, a ring gear 19r and a carrier 19c rotatably supporting pinions 19p, each meshed with both the sun gear and ring gear. The sun gear 19s is coupled with the secondary shaft 9c and serves as the second rotary element, the ring gear 19r is coupled with the output shaft 5 and serves as the third rotary element and the carrier 19c is coupled with the secondary side sprocket 20 to serve as the first rotary element. Further, an endless member 22, such as a silent chain, roller chain, timing belt or the like, is trained around the primary side and secondary side sprockets 16, 20.

The gear 21 fixed to the output shaft 5 is meshed with the large gear 23a of a speed reduction gear unit 23 and the small gear 23b of the unit is meshed with the ring gear 24 of a differential gear unit 25 which outputs differential rotation to right and left axle shafts 6a, 6b constituting the third shaft.

Next, power transmission by the continuously variable transmission system 1 will be described with reference to FIG. 1(a), FIG. 1(b), FIG. 1(c), FIG. 2 and FIG. 3. The rotation of the engine crank shaft 2 is transmitted to the input shaft 3 through the damper 12. In a low mode in which the low clutch $C_L$ is engaged and the high clutch $C_H$ is disengaged, the rotation of the input shaft 3 is transmitted to the primary pulley 7 as well as to the carrier 19c of the planetary gear set 19 through the power transmission unit 26 composed of the primary side sprocket 16, endless member 22 and secondary side sprocket 20. The rotation of the primary pulley 7 is continuously varied to change the pulley ratio of the primary and secondary pulleys by axial force actuating means such as a hydraulic servo or the like (described later) and transmitted to the secondary pulley 9 and further the speed-changed rotation of the pulley 9 is transmitted to the sun gear 19s of the planetary gear 19.

As shown in the speed graph of a speed of FIG. 1(b), the carrier 19c to which a constant speed rotation is transmitted through the power transmission unit 26, acts as a reaction element in the planetary gear unit 19 and a continuously variable rotation is transmitted from the CVT 11 to the sun gear 19s, and the torques transmitted via these two paths, i.e. the torques input to the carrier and sun gear are combined and transmitted to the output shaft 5 through the ring gear 19r. Since the output shaft 5 is coupled with the ring gear 19r, which is a rotary element other than the reaction element, torque circulation is caused in the planetary gear 19, and the sun gear 19s and the carrier 19c are rotated in the same direction. As a result, the output shaft 5 changes between forward (Lo) and reverse (Rev) rotation across a state of zero rotation. That is, when the output shaft 5 is rotated in the forward direction with torque circulation, the belt type continuously variable transmission unit 11 transmits torque from the secondary pulley 9 to the primary pulley 7, whereas when the output shaft 5 is rotated in the reverse direction, the transmission unit 11 transmits torque from the primary pulley 7 to the secondary pulley 9.

FIG. 1(c) shows torque circulation through the belt type continuously variable transmission unit (CVT) 11 with the output shaft 5 rotating in the aforementioned forward direction. In this state, torque from engine E/G is output through power transmission unit 26 to the first rotary element (in this embodiment carrier 19c) as indicated by arrow "A". A planetary gear unit 19 outputs a portion of that engine torque as indicated by arrow "B" and recirculates a second portion of the input torque back through the CVT 11 as indicated by arrow "C". That portion of the torque routed back to CVT 11 is returned to the first rotary element as indicated by arrow "D". In this manner, a loop of torque circulating through the CVT is established as indicated by arrow "E". In a conventional CVT, the power transmission path, in which engine torque is transmitted to an output shaft, is via a single path, i.e. through the V-belt of the CVT. In contrast, in the torque-circulation-type-CVT of the present invention two torque transmission paths are established, one path through the CVT unit 11 and planetary gear unit 19 and a second through the power transmission unit 26 and the planetary gear unit 19. The relative amounts of torque transmitted through these two paths is changed by changing the pulley ratio of the CVT. It should be noted that the transmission system of the present invention dispenses with the conventional fluid transmission unit, e.g. torque converter, or electromagnetic clutch. Further, the transmission system of the present invention does not have separate clutches for establishing forward and reverse—note that the clutch $C_L$ is engaged in both forward and reverse.

In a high mode in which the low clutch $C_L$ is disengaged and the high clutch $C_H$ is engaged, since power transmission to the planetary gear unit 19 through the power transmission unit 26 is shut off, the planetary gear unit 19 is rotated integrally with the high clutch $C_H$ by being engaged therewith. Consequently, the rotation of the input shaft 3 is entirely transmitted to the output shaft 5 through the belt type CVT unit 11 and the high clutch $C_H$. That is, the CVT 11 transmits power from the primary pulley 7 to the secondary pulley 9. Further, the rotation of the output shaft 5 is transmitted to the differential gear unit 25 through the output gear 21 and speed reduction gear unit 23 and further transmitted to the right and left front wheels through the right and left axle shafts 6a, 6b.

Figure 2:
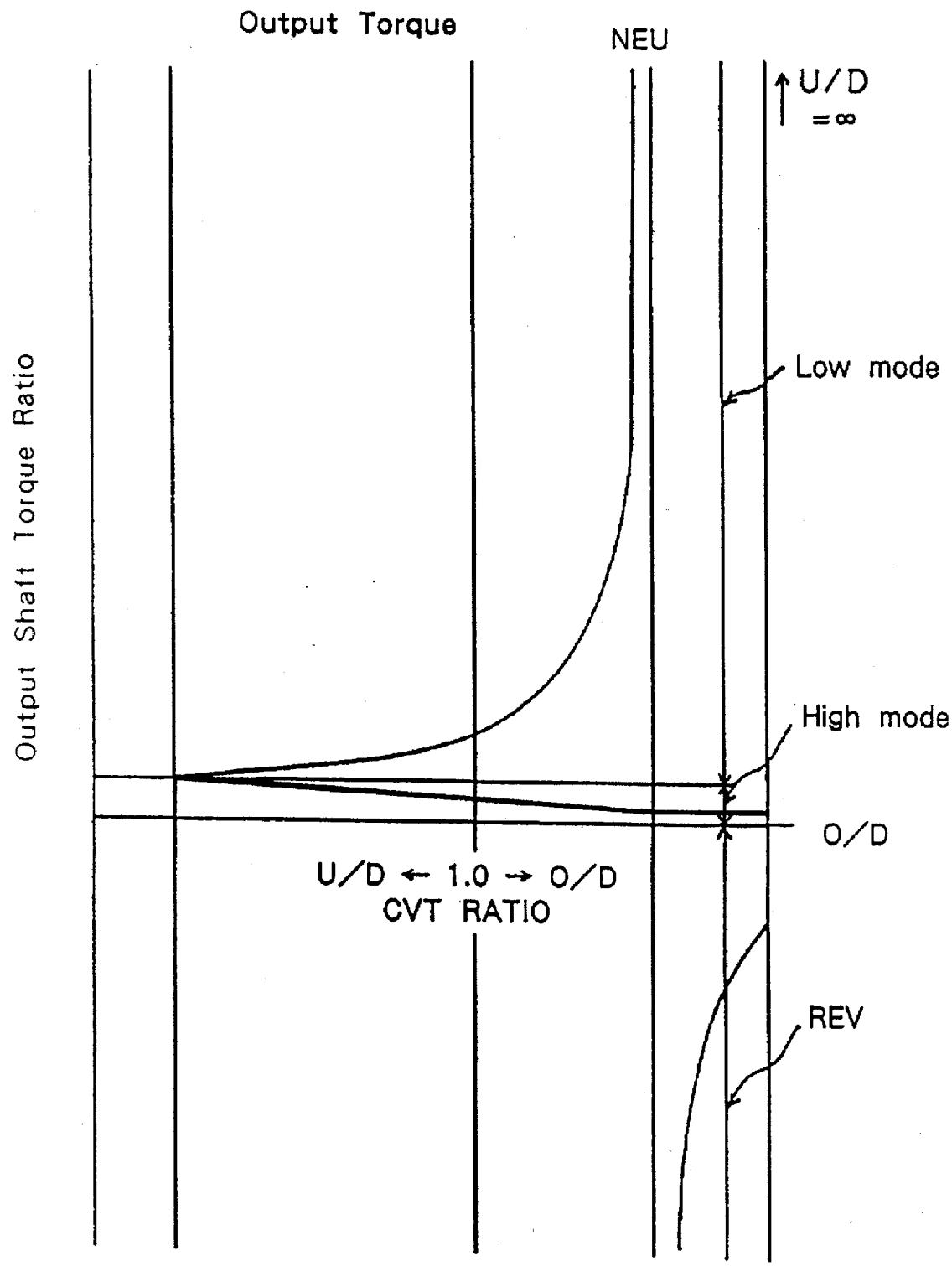
FIG. 2 is a graph of output shaft torque versus the torque ratio of the CVT.
Figure 3:
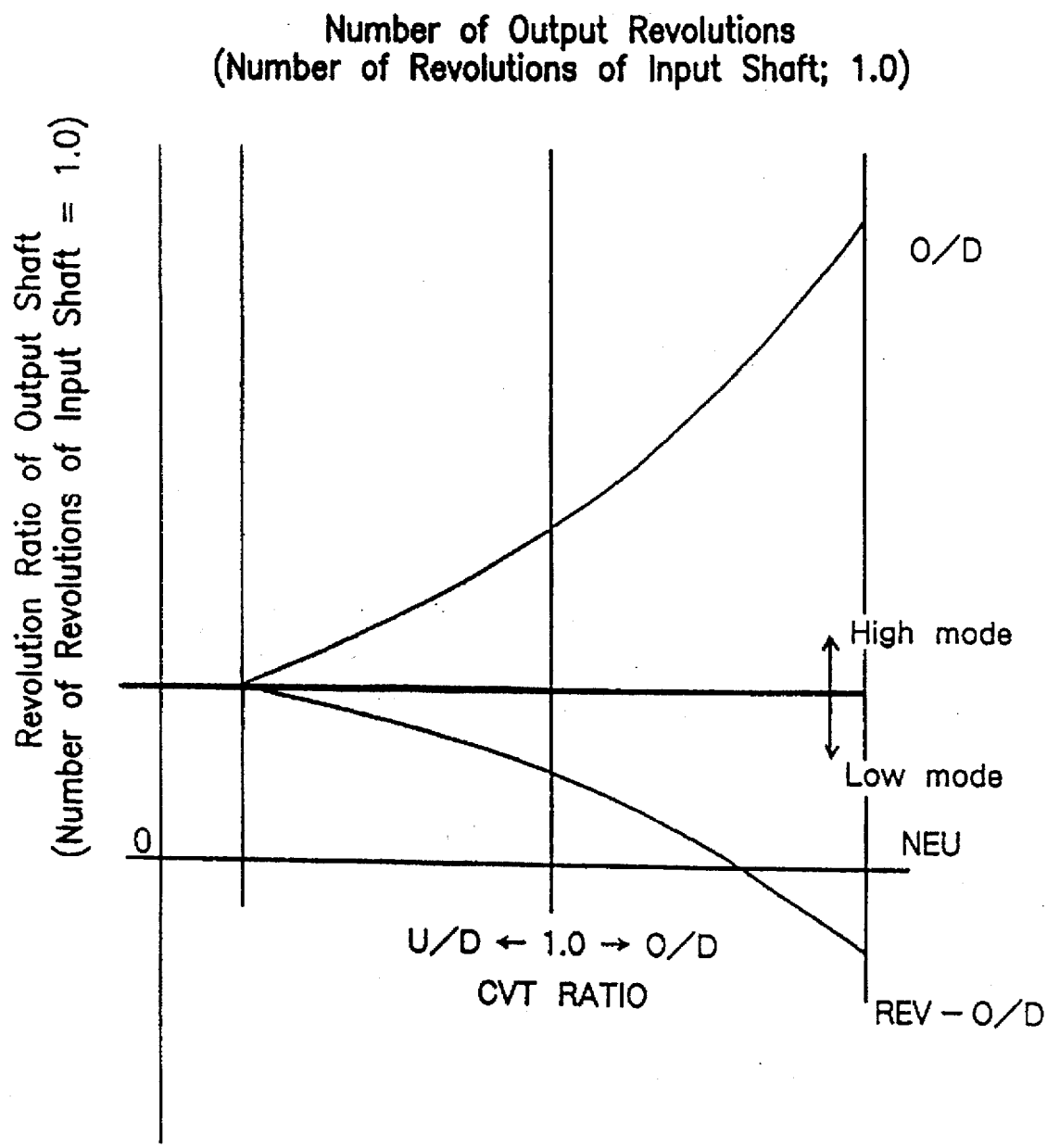
FIG. 3 is a graph of ratio of output shaft speed to input shaft speed versus pulley ratio of the CVT unit.

As shown in the speed graph of FIG. 1(b), the output torque graph of FIG. 2 and the output r.p.m. graph of FIG. 3, since the sun gear 19s is at its highest speed of rotation when the belt type CVT unit 11 is at its limit of O/D operation (at the position "a" in the graph of FIG. 1) in the low mode, the ring gear 19r is rotated in a reverse direction with respect to the carrier 19c having a constant r.p.m. and the reverse rotation (REV) is transmitted to the output shaft 5. When the CVT unit 11 is shifted toward the speed reducing (U/D) direction, the r.p.m. of the reverse rotation is reduced, so that a neutral position (NEU) where the r.p.m. of the output shaft 5 is zero is reached at a predetermined pulley ratio determined by the gear ratio of the planetary gear unit 19 and the power transmission unit 26. When the CVT unit 11 is further shifted in the speed reducing direction, since the ring gear 19r is switched to forward rotation, rotation in a forward traveling direction is transmitted to the output shaft 5. At this time, as apparent from FIG. 2, the torque of the output shaft 5 goes to infinity in the vicinity of the neutral position NEU.

Next, when the CVT unit 11 reaches the end limit of the speed reducing direction (U/D), the high clutch $C_H$ is engaged and operation is switched to the high mode. In the high mode, since the rotation output from the CVT unit 11 is transmitted to the output shaft 5 as is, operation is along a horizontal line b in the speed graph of FIG. 1(b). Thereafter, as the CVT unit 11 is shifted in a speed increasing (O/D) direction, the rotation of the output shaft 5 is also increased in speed and the amount of transmitted torque is reduced accordingly. Note that λ in FIG. 1(b) represents the ratio (Zs/Zr) of the number of teeth Zs of the sun gear to the number of teeth of the ring gear Zr.

Next, an embodiment of a hydraulic control unit for control of the continuously variable transmission according to the present invention will be described.

Figure 4:
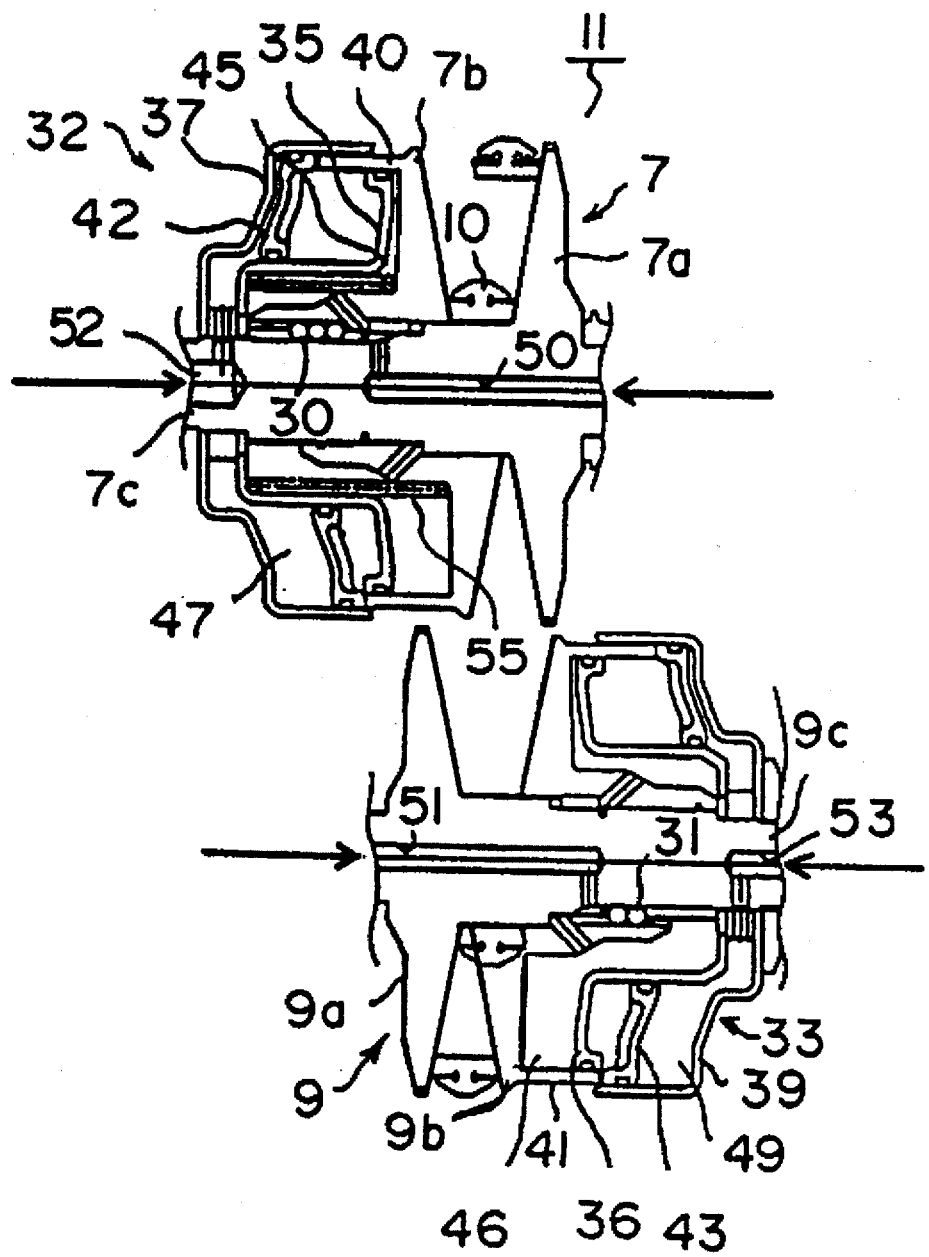
FIG. 4 is a cross-sectional view of double chamber type hydraulic servos applying axial forces to primary and secondary pulleys.

In the primary and secondary pulleys 7, 9, the movable sheaves 7b, 9b are slidably supported by the bosses 7c, 9c of the stationary sheaves 7a, 9a through ball splines 30, 31 and hydraulic servos 32, 33 are disposed against the back surfaces of these movable sheaves 9b, 9b to serve as axial force actuating means for applying axial forces to the pulleys, as shown in FIG. 4. Both of the hydraulic servos 32, 33 have partition members 35, 36 fixed to the bosses 7c, 9c of the stationary sheaves, cylinder members 37, 39, drum members 40, 41 fixed to the back surfaces of the movable sheaves 7b, 9b and second piston members 42, 43. The partition members 35, 36 are engaged with the drum members 40, 41 in an oil tight state and the second piston members 42, 43 are mounted between the cylinder members 37, 39 and the partition members 35, 36 in an oil tight state, to thereby form a double piston structure composed of first hydraulic chambers 45, 46 and second hydraulic chambers 47, 49, respectively.

The first hydraulic chambers 45, 46 in the above hydraulic servos 32, 33 define piston surfaces on the back surfaces of the movable sheaves 7b, 9b, respectively, and the piston surfaces have the same effective pressure-receiving areas on the primary side and the secondary side. Further, oil passages 50, 51, 52, 53 are formed in the bosses 7c, 9c of the fixed sheaves 7c, 9c on the primary side and secondary side and provide communication between the first hydraulic chambers 45, 46 and second hydraulic chambers 47, 49. In addition, a preloading spring 55 is disposed under compression in the first hydraulic chamber 45 of the primary side hydraulic servo 32.

Figure 5:
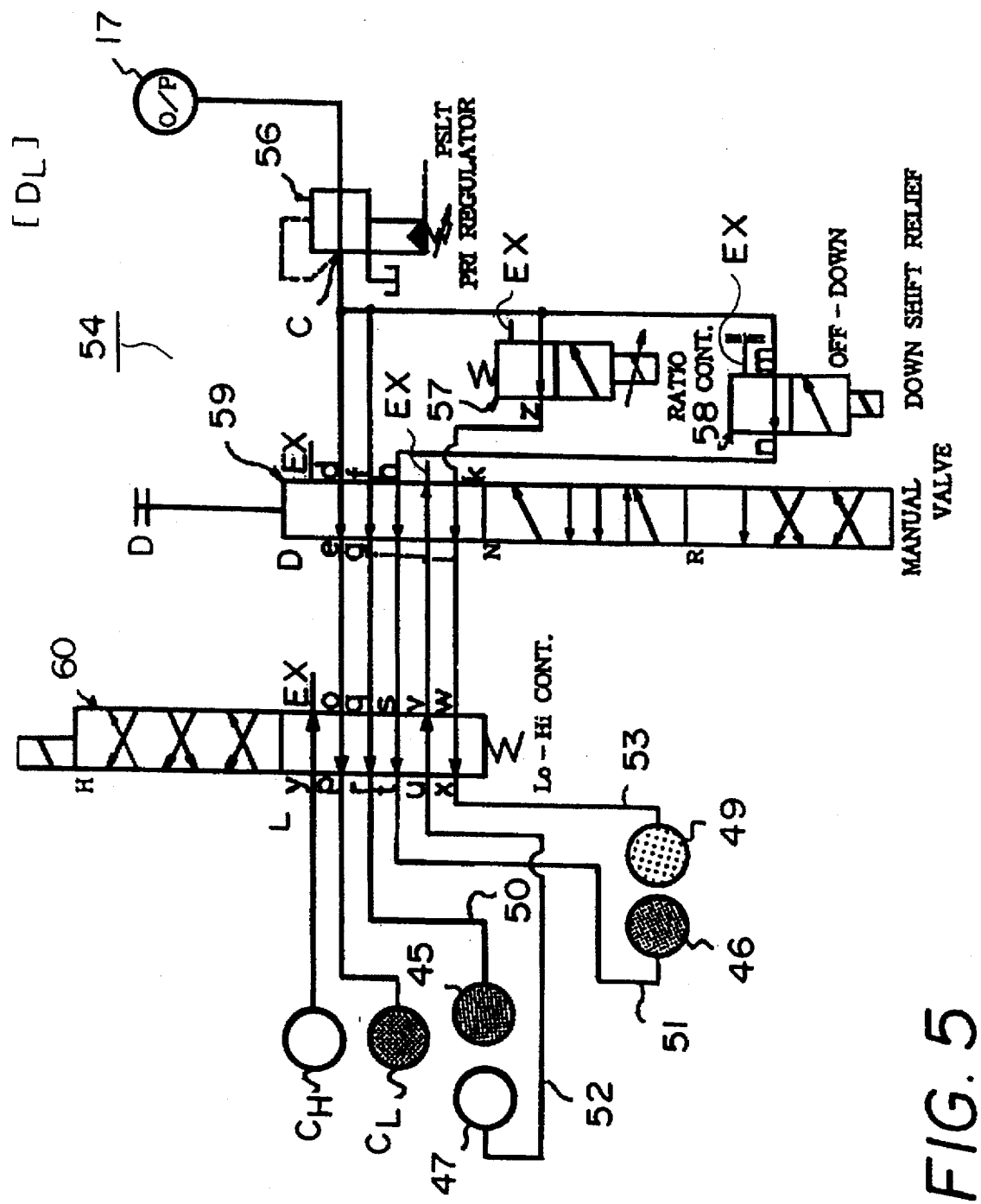
FIG. 5 is a hydraulic circuit diagram of a hydraulic control unit positioned to establish a low (L) mode state in D range.

As shown in FIG. 5, the hydraulic control mechanism (means) 54 of this embodiment has a primary regulator valve 56, a ratio control valve 57, a down-shift relief valve 58, a manual valve (switching valve, selection means) 59 and a low/high control valve (low/high shifting means) 60. Thus, the hydraulic pressure from the oil pump 17 is regulated, switched and supplied to the first and second hydraulic chambers 45, 46, 47, 49 of the above hydraulic servos 32, 33, the low clutch (hydraulic servo) $C_L$ and high clutch (hydraulic servo) $C_H$.

Next, operation of the above hydraulic control unit 54 will be described with reference to FIG. 4 to FIG. 8.

As shown in FIG. 8, when the low (L) mode is employed in D range, a predetermined hydraulic pressure is supplied to the hydraulic chamber 45 of the primary side hydraulic servo 32 and a predetermined hydraulic pressure acts on both the first hydraulic chamber 46 and second hydraulic chamber 49 of the secondary side hydraulic servo 33 and further a hydraulic pressure engages the low clutch $C_L$. That is, in the low mode, the manual valve 59 is moved to the D range position shown in FIG. 5 so as to cause a port d to communicate with a port e, a port f with a port g, a port h with a port i and a port k with a port l as well as a port j with a drain port Ex. Further, the low/high control valve 60 is switched to cause a port o to communicate with a port p, a port q with a port r, a port s with a port t, a port u with a port v and a port w with a port x as well as a port y with the drain port Ex.

Therefore, the hydraulic pressure from the output port c of the primary regulator valve 56 is supplied to the low clutch hydraulic servo $C_L$ through the ports d and e in the manual valve 59 located at the D range position (refer to FIG. 5) and to the ports o and p of the low/high control valve 60 to cause the clutch $C_L$ to become engaged. In addition, the above hydraulic pressure is supplied to the first hydraulic chamber 45 of the primary hydraulic servo 32 through the ports f and g of the manual valve and further the ports q and r of the low/high control valve 60. In a state other than a down shift operation, the down-shift relief valve 58 is located at a normal position where the port m communicates with the port n and the hydraulic pressure from the above output port c is supplied to the first hydraulic chamber 46 of the secondary hydraulic servo 33 through the ports m and n, the ports h and i of the manual valve 59 and the ports s and t of the low/high control valve 60. The hydraulic pressure from the above output port c is regulated by the ratio control valve 57 so that it is brought to a value corresponding to a target pulley ratio and the hydraulic pressure from the output port z is supplied to the second hydraulic chamber 49 of the hydraulic servo 33 through the ports k and 1 of the manual valve 59 and the ports w and x of the low/high control valve 60. Note, in this state, the high clutch hydraulic servo $C_H$ communicates with the drain port Ex from the port y of the low/high control valve 60 and is thereby released. Further, the second hydraulic chamber 47 of the primary hydraulic servo 32 communicates with the drain port Ex through the ports u and v of the low/high control valve 60 and the port j of the manual valve 59.

With this operation, the low clutch $C_L$ is connected and the axial force produced by the secondary side hydraulic servo 33 in which a hydraulic pressure acts on both the first and second hydraulic chambers 46, 49 is made higher than the axial force exerted by the primary side hydraulic servo 32, in which a hydraulic pressure acts on only the first hydraulic chamber 45. Thus, the opening/closing of the above ratio control valve 57 adjusts the axial forces on both the pulleys 9, 7 corresponding to the torque transmitted from the secondary pulley 9 to the primary pulley 7. With this operation, the hydraulic pressure of the second hydraulic chamber 49 of the secondary hydraulic servo 33 is regulated to thereby properly adjust the axial force produced by the hydraulic servo 33, so that the pulley ratio (torque ratio) is properly changed. In this state, the engine torque which is transmitted from the input shaft 3 to the carrier 19c of the planetary gear 19 through the low clutch $C_L$ and power transmission unit 26 is taken out from the output shaft 5 through the ring gear 19r while being regulated by the CVT unit 11 through the sun gear 19s, based on the above predetermined pulley ratio.

Figure 6:
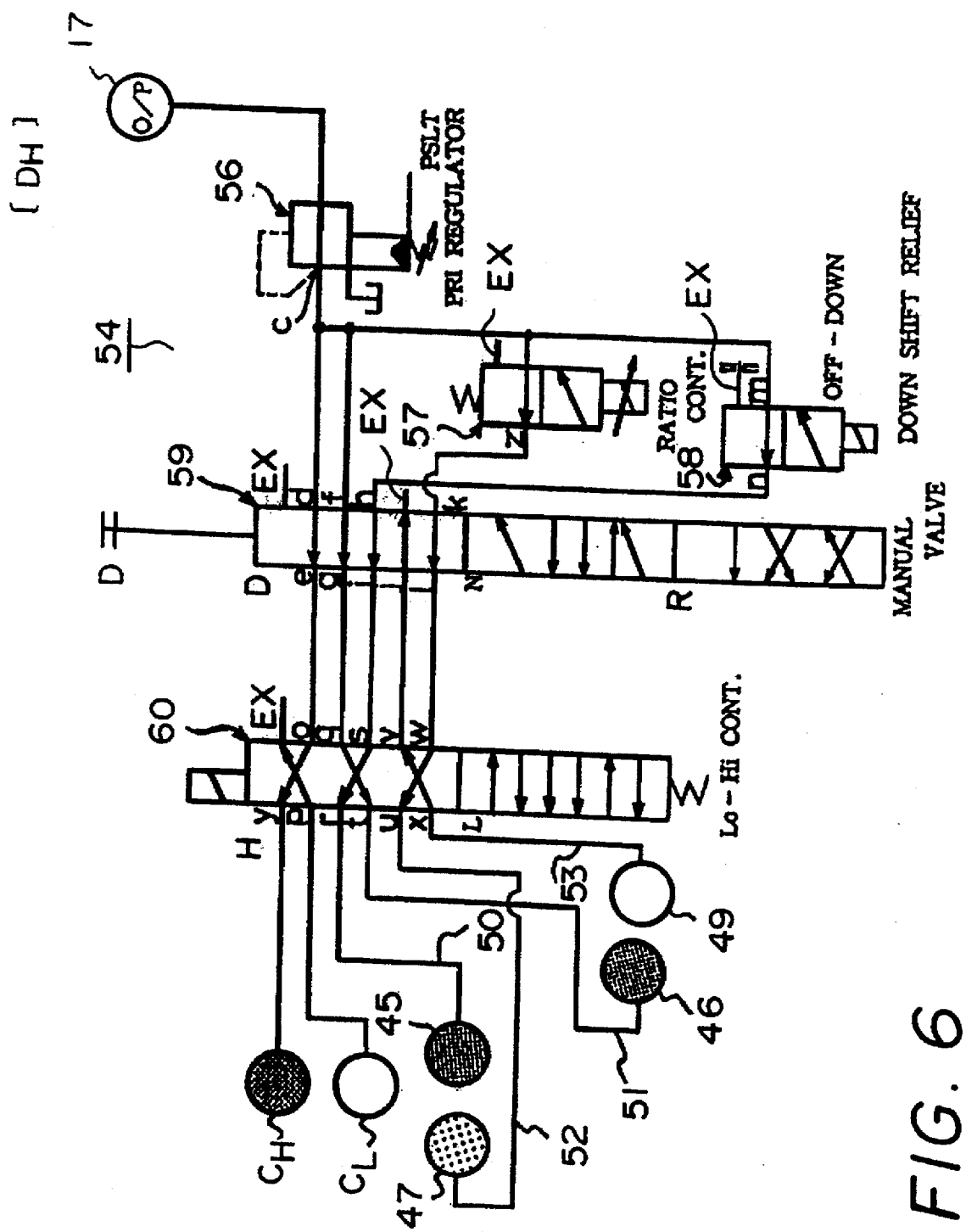
FIG. 6 is the hydraulic circuit diagram of FIG. 5 positioned to establish a high (H) mode state in the D range.

In the high (H) mode in the D range, a predetermined hydraulic pressure is supplied to the first and second hydraulic chambers 45, 47 of the primary side hydraulic servo 32 as well as to the first hydraulic chamber 46 of the secondary side hydraulic servo 33 and further to the high clutch hydraulic servo $C_H$ as shown in FIG. 8. That is, in the high (H) mode, although the manual valve 59 is located at the D range position as in the low mode, since the low/high control valve 60 is switched to the high position (H), the port o communicates with the port y, the port q with the port t, the port s with the port r, the port x with the port v and the port w with the port u, respectively, and the port p communicates with the drain port Ex as shown in FIG. 6.

Therefore, the hydraulic pressure output from the primary regulator valve 56 is supplied to the high clutch hydraulic servo $C_H$ through the ports d and e of the manual valve 59 and the ports o and y of the low/high control valve 60 to thereby cause the clutch $C_H$ to engage. Further, the above hydraulic pressure is supplied to the first hydraulic chamber 46 of the secondary hydraulic servo 33 through the ports f and g of the manual valve 59 and the ports q and t of the low/high control valve 60. In addition, the hydraulic pressure is supplied to the first hydraulic chamber 45 of the primary hydraulic servo 32 through the ports m and n of the down-shift relief valve 58, the ports h and i of the manual valve 59 and the ports s and r of the low/high control valve 60 and to the second hydraulic chamber 47 of the primary hydraulic servo 32 through the output port z of the ratio control valve 57, in which the hydraulic pressure is properly regulated, the ports k and 1 of the manual valve 59 and the ports w and u of the low/high control valve 60. The low clutch hydraulic servo $C_L$ is released by being brought into communication with the drain port Ex from the port p of the low/high control valve 60. Further, the second hydraulic chamber 49 of the secondary hydraulic servo 33 communicates with the drain port Ex through the ports x and v of the low/high control valve 60 and the port j of the manual valve 59.

By this operation, the high clutch $C_H$ is engaged and the axial force produced by the primary side hydraulic servo 32, which receives a hydraulic pressure in its first and second hydraulic chambers 45, 47, becomes higher than the axial force produced by the secondary side hydraulic servo 33 in which a hydraulic pressure is supplied only to the first hydraulic chamber 46. Thus, above ratio control valve 57 is properly adjusted to produce axial forces corresponding to the torque transmitted from the primary pulley 7 to the secondary pulley 9. By this operation, the hydraulic pressure of the second hydraulic chamber 47 of the primary hydraulic servo 32 is regulated to adjust the axial force produced by the primary hydraulic servo 32, so that a proper pulley ratio (torque ratio) can be obtained. In this state, the torque transmitted from an engine to the input shaft 3 is changed by the CVT 11, in transmission from the primary pulley 7 to the secondary pulley 9, and is output at the output shaft 5 through the high clutch $C_H$.

Figure 7:
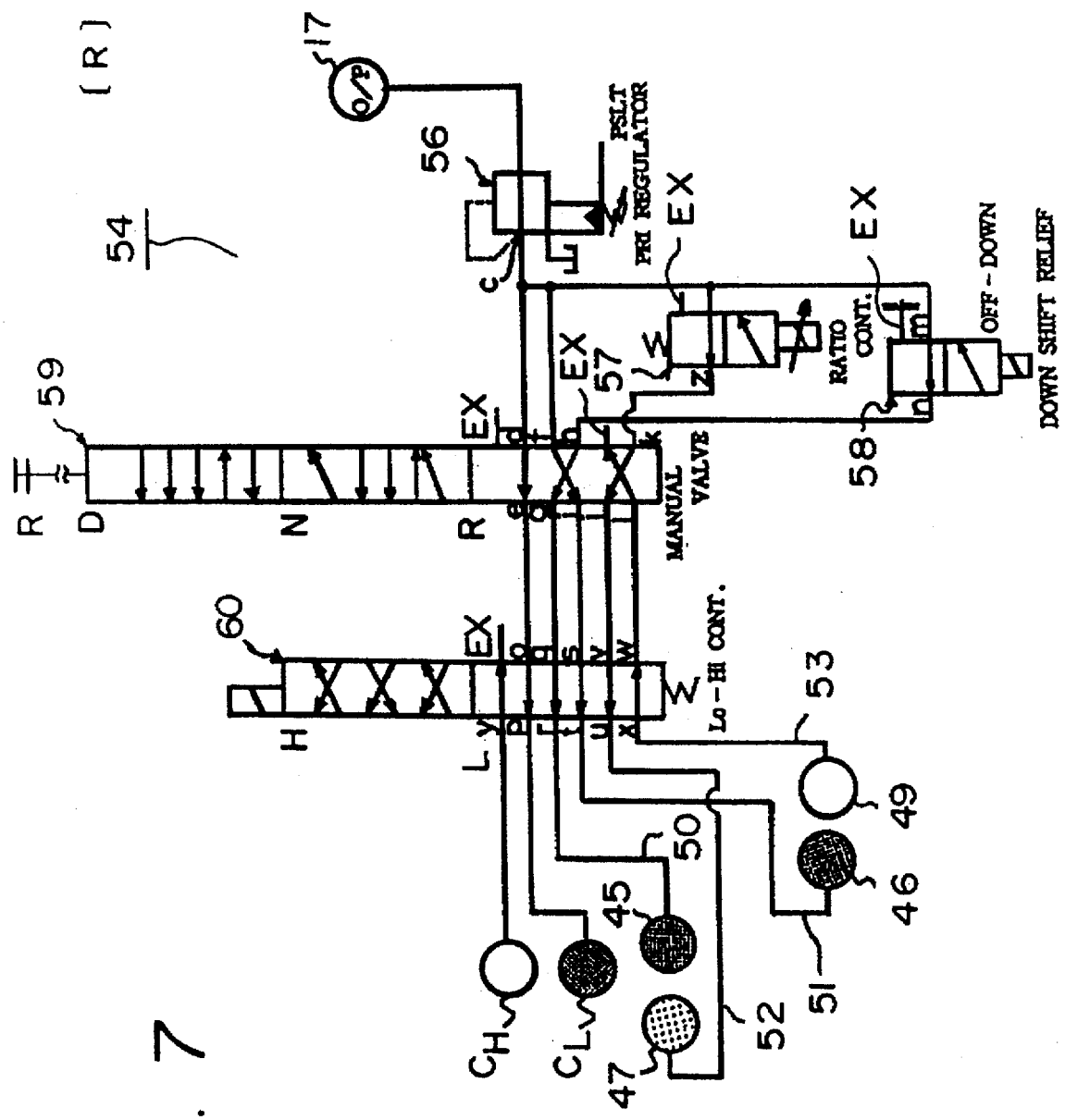
FIG. 7 is the hydraulic circuit diagram of FIG. 5 positioned to establish R range.

In reverse range (R), a predetermined hydraulic pressure is supplied to the first and second hydraulic chambers 45, 57 of the primary side hydraulic servo 32 as well as to the first hydraulic chamber 46 of the secondary side hydraulic servo 33 and further to the low clutch hydraulic servo $C_L$ as shown in FIG. 8. That is, in the reverse range, the manual valve 59 is located at the reverse (R) range position and the low/high control valve 60 is located at the low position (L) as shown in FIG. 7. In this state, the port d communicates with the port e, the port f with the port i and the port k with the port j, respectively, in the manual valve 59 and the port 1 communicates with the drain port Ex. Further, the port o communicates with the port p, the port q with the port r, the port s with the port t, the port v with the port u and the port x with the port w, respectively in the low/high control valve 60. As in the low (L) mode, the port y communicates with the drain port Ex.

Therefore, the hydraulic pressure from the output port c of the primary regulator valve 56 is supplied to the low clutch hydraulic servo $C_L$ through the ports d and e of the manual valve 59 and the ports o and p of the low/high control valve 60 and further to the first hydraulic chamber 46 of the secondary hydraulic servo 33 through the ports f and i of the manual valve 59 and the ports s and t of the low/high control valve 60. Further, the above hydraulic pressure is supplied to the first hydraulic chamber 45 of the primary hydraulic servo 32 through the ports m and n of the down-shift relief valve 58, the ports h and g of the manual valve 59 and the ports q and r of the low/high control valve 60. In addition, the hydraulic pressure is properly regulated by the ratio control valve 57 and supplied from the output port z thereof to the second hydraulic chamber 47 of the primary hydraulic servo 32 through the ports k and j of the manual valve 59 and the ports v and u of the low/high control valve 60.

By this operation, the low clutch $C_L$ is engaged and the axial force produced by the primary side hydraulic servo 32, in which a hydraulic pressure acts on the first and second hydraulic chambers 45, 47, becomes higher than the axial force exerted by the secondary side hydraulic servo 33, in which a hydraulic pressure acts only on the first hydraulic chamber 46. Thus, a state wherein axial forces corresponding to the torque transmitted from the primary pulley 7 to the secondary pulley 9 is established and the hydraulic pressure in the second hydraulic chamber 47 of the primary hydraulic servo 32 is regulated by the adjustment of the ratio control valve 57 to thereby adjust the axial force exerted by the hydraulic servo 32, so that a proper pulley ratio can be obtained. In this state, since the pulley ratio of the CVT 11 is in a predetermined speed increasing (O/D) state, the engine torque from the input shaft 3 is transmitted to the carrier 19c of the planetary gear unit 19 through the low clutch $C_L$ and power transmission unit 26 as well as to the sun gear 19s through the CVT 11 and both of the torques are thus combined by the planetary gear unit 19 and output at the output shaft 5 through the ring gear 19r as reverse rotation.

In park position P and neutral position N of the manual valve 59, both the low clutch $C_L$ and high clutch $C_H$ are released and a predetermined hydraulic pressure is supplied to the first hydraulic chambers 45, 46 of the primary side and secondary side hydraulic servos 32, 33 as shown in FIG. 8. That is, the port f communicates with the port g, the port h with the port i in the manual valve 59 and further the ports e, j, l communicate with the drain port Ex, respectively. In addition, the low/high control valve 60 is kept at the aforesaid low position L.

Therefore, the hydraulic pressure output from the primary regulator valve 56 is supplied to the first hydraulic chamber 45 of the primary hydraulic servo 32 through the ports f and g of the manual valve 59 and the ports q and r of the low/high control valve 60 as well as to the first hydraulic chamber 46 of the second hydraulic servo 33 through the ports m and n of the down-shift relief valve 58, the ports h and i of the manual valve 59 and the ports s and t of the low/high control valve 60. Further, the hydraulic pressure of the high clutch hydraulic servo $C_H$ is released through the port y of the low/high control valve 60 and the drain port Ex, the hydraulic pressure of the low clutch hydraulic servo $C_L$ is released through the ports p and o of the low/high control valve 60, the port e of the manual valve 59 and the drain port Ex, the hydraulic pressure of the second hydraulic chamber 47 of the primary hydraulic servo 32 is released through the ports u and v of the low/high control valve 60, the port j of the manual valve 59 and the drain port Ex, and the hydraulic pressure of the second hydraulic chamber 49 of the second hydraulic servo 33 is released through the ports x and w of the low/high control valve 60, the port l of the manual valve 59 and the drain port Ex.

By this operation, since both the low clutch $C_L$ and high clutch $C_H$ are released and the same hydraulic pressure acts only on the first hydraulic chambers 45, 46 of the primary hydraulic servo 32 and secondary hydraulic servo 33, approximately the same axial force acts on both the primary and secondary pulleys 7, 9. Note that since a predetermined hydraulic pressure is supplied from the primary regulator valve 56 to the first hydraulic chambers 45, 46 of both the primary and secondary hydraulic servos 32, 33, respectively, in the aforesaid respective positions D, N and R and the low (L) mode and high (H) mode, a predetermined axial force corresponding to the transmitted torque is maintained so that the belt does not slip. Further, since the regulated hydraulic pressure from the ratio control valve 57 is supplied to the second hydraulic chamber 47 or 49 of one of the hydraulic servos 32, 33, the ratio of the axial forces on the pulleys 7, 9 is adjusted so that a speed changing operation is executed to obtain a predetermined pulley ratio.

Further, when a down-shift is executed during coasting, the down-shift relief valve 58 is switched to cause the port n to communicate with the drain port Ex. By this operation, the hydraulic pressure supplied to the first hydraulic chamber 45 or 46 as described above is discharged through predetermined ports, the port n of the relief valve 58 and the drain port Ex and the hydraulic pressure in the hydraulic servo which had been receiving the higher hydraulic pressure is made lower than the hydraulic pressure of the hydraulic servo which had been receiving the lower hydraulic pressure.

Next, a second embodiment will be described with reference to FIG. 9 to FIG. 13.

Figure 9:
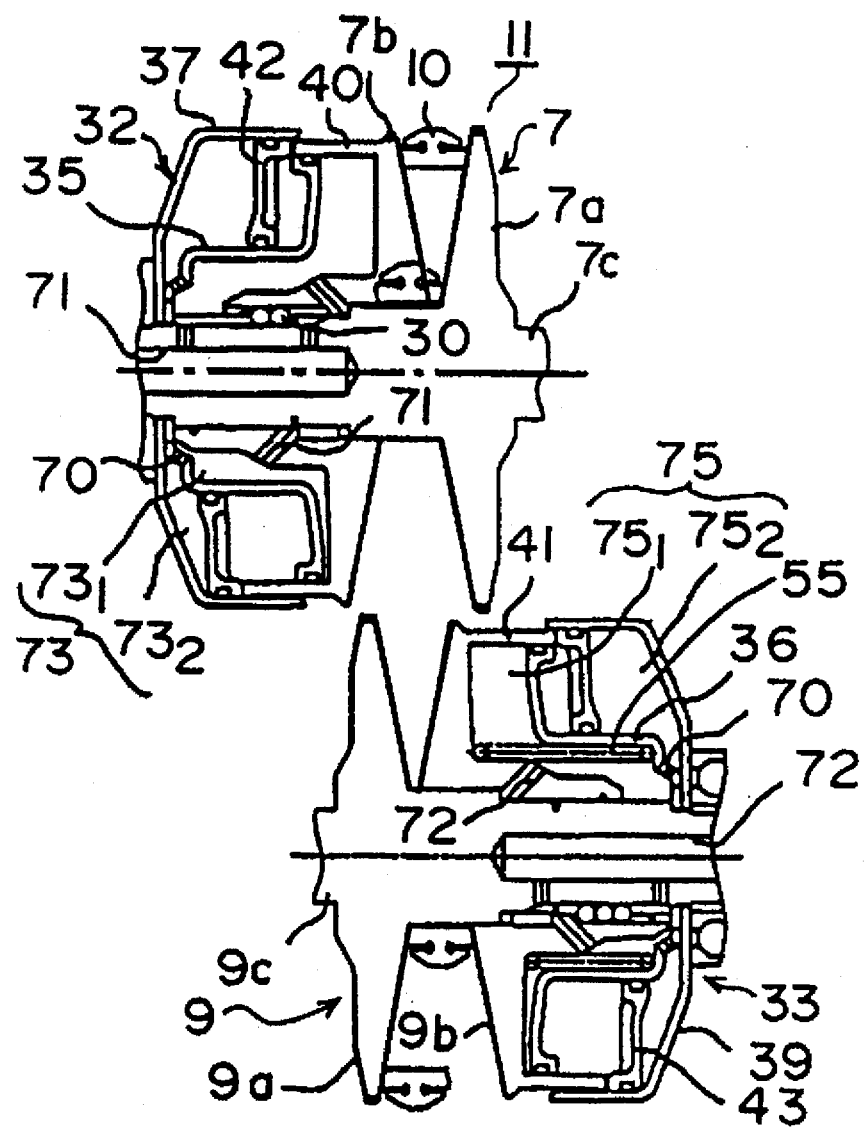
FIG. 9 is a cross-sectional view of double regulator type hydraulic servos.
Figure 10:
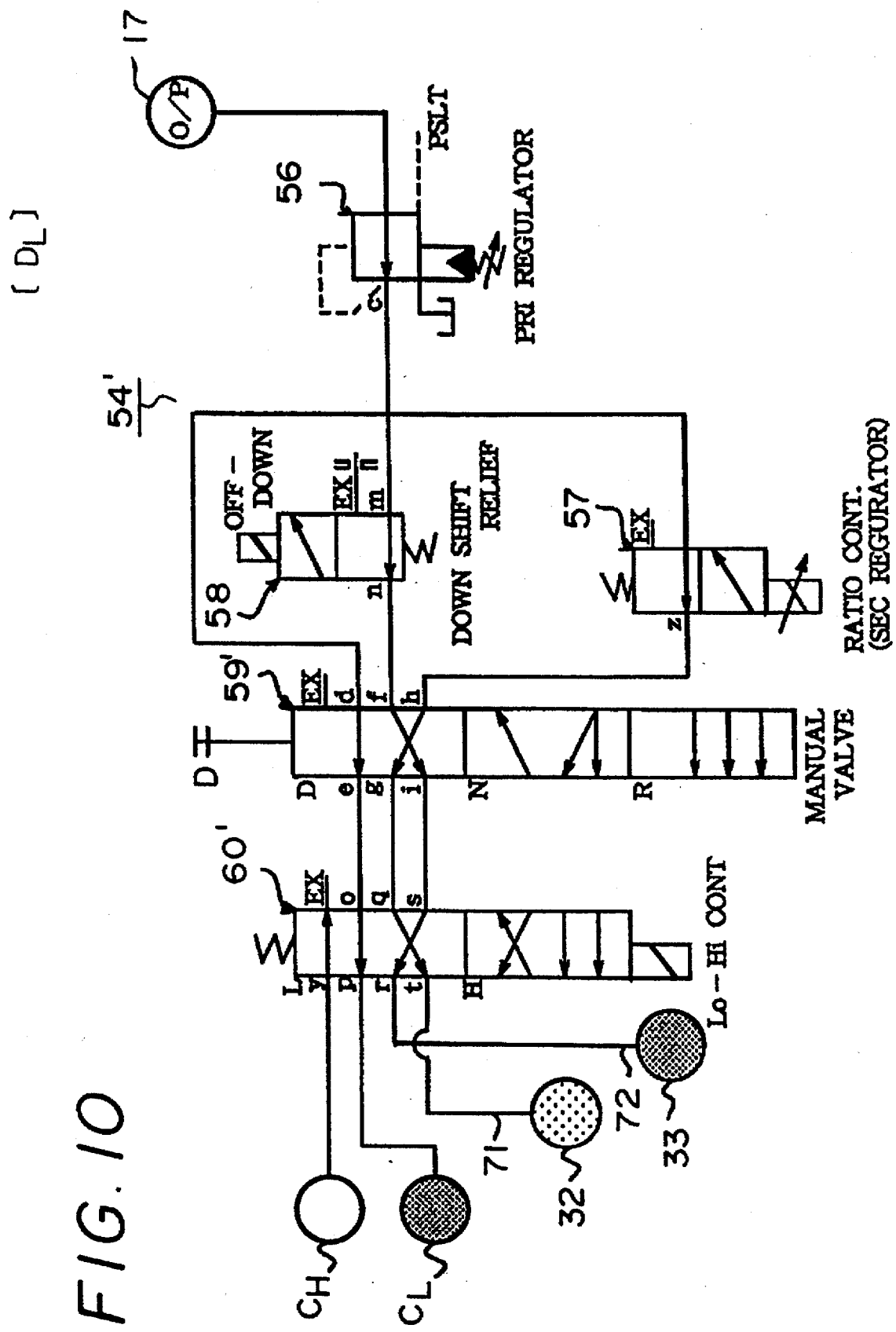
FIG. 10 is a hydraulic circuit diagram of a hydraulic control unit for controlling the double regulator type hydraulic servos of FIG. 9, showing a low (L) mode state in D range.
Figure 11:
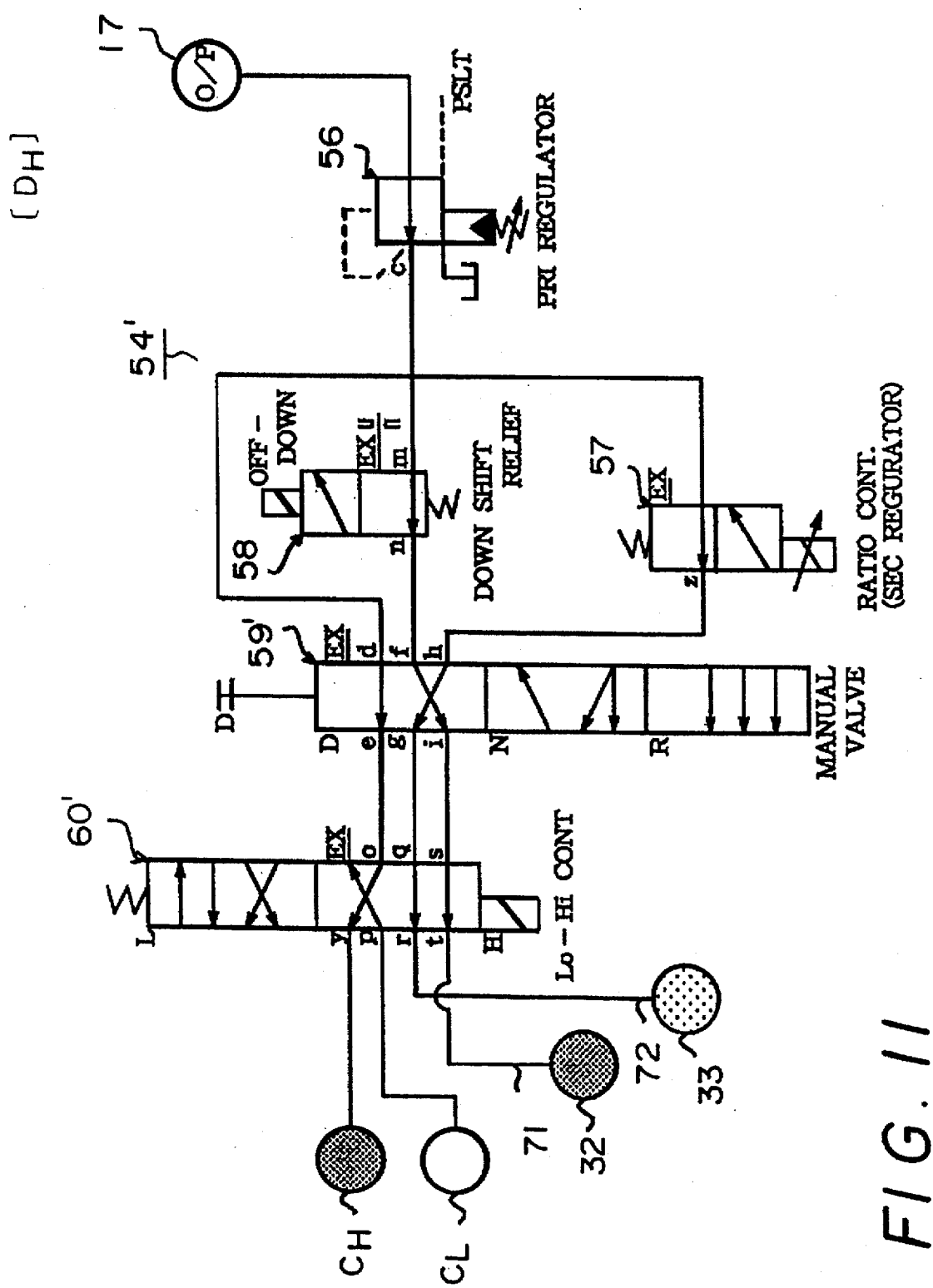
FIG. 11 is the hydraulic circuit diagram of FIG. 10 positioned to establish a high (H) mode in the D range.
Figure 12:
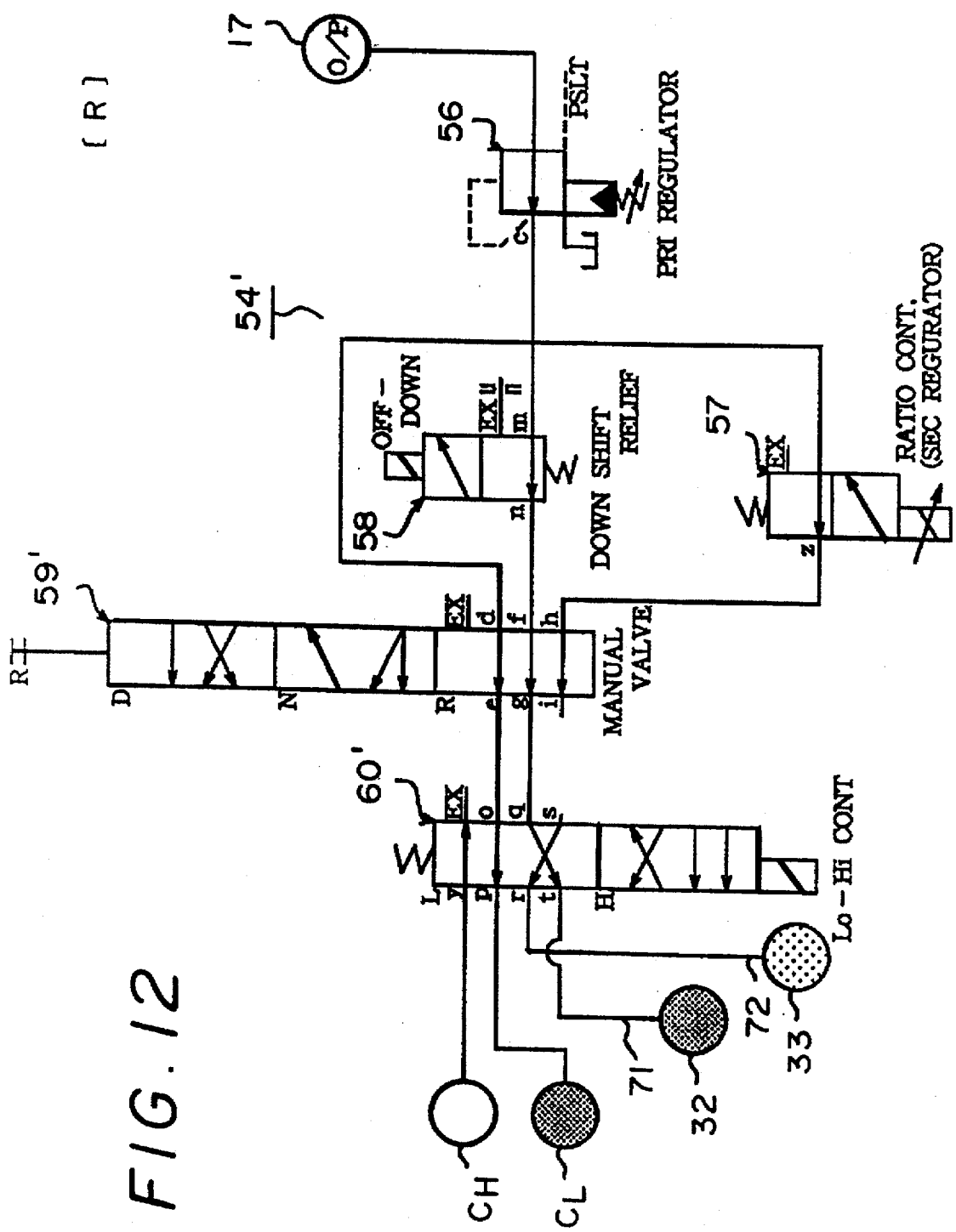
FIG. 12 is the hydraulic circuit diagram of FIG. 10 positioned to establish R range.

Although primary and secondary side hydraulic servos 32, 33 of this embodiment shown in FIG. 9 have first and second hydraulic chambers $73_1$, $75_1$, $73_2$, $75_2$, as in the embodiment of FIG. 4, holes 70, 70 are provided in the partition members 35, 36 so as to increase the pressure receiving areas in a simple manner. Thus, this embodiment has hydraulic actuators each with effectively a single hydraulic chamber (73, 75), supplied with hydraulic pressure from an oil passage (71, 72). Thus, the hydraulic chambers 73, 75 of both the hydraulic servos 32, 33 have the same pressure-receiving areas. Further, a preloading spring 55 is disposed in the first hydraulic chamber $75_1$ of the secondary side hydraulic servo 33 under compression. As shown in FIG. 10 to FIG. 12, the control unit 54' has a primary regulator valve 56, a ratio control valve 57 constituting a secondary regulator valve and a down-shift relief valve 58 which are disposed in series from an oil pump 17. The control unit 54' further includes a manual valve 59' and a low/high control valve 60', each having an oil passage structure different from that of the above embodiment. The control mechanism 54' operates as shown in the operation table of FIG. 13.

In the low (L) mode in D range, a relatively low line pressure ($P_L$-L) is supplied to the hydraulic chamber 73 of the primary hydraulic servo 32 from the ratio control valve 57, a relatively high line pressure ($P_L$-H) is supplied to the hydraulic chamber 75 of the secondary hydraulic servo 33 from the primary regulator valve 56 and a line pressure is supplied to a low clutch hydraulic servo $C_L$, as shown in FIG. 13. Since the manual valve 59' is in the D position, a port d communicates with a port e, a port f with a port i and a port h with a port g, and since the low/high control valve 60' is located at the low (L) position, a port o communicates with a port p, a port q with a port t and a port s with a port r and a port y communicates with a drain port Ex, as shown in FIG. 10.

Therefore, the relatively high line pressure ($P_L$-H) regulated by the primary regulator valve 56, is supplied to the low clutch hydraulic servo $C_L$ through the ports d and e of the manual valve 59' and the ports o and p of the low/high control valve 60' and further to the secondary hydraulic servo 33 through the ports m and n of the down-shift relief valve 58, the ports f and i of the manual valve '59 and the ports s and r of the low/high control valve 60'. Further, the pressure output from the primary regulator valve 56 is further regulated by the ratio control valve (secondary regulator valve) 57 and the resulting regulated relatively low line pressure ($P_L$-L) is supplied from the output port z thereof to the primary hydraulic servo 32 through the ports h and g of the manual valve 59' and the ports q and t of the low/high control valve 60'. The hydraulic pressure of high clutch hydraulic servo $C_H$ is released through the port y and drain port Ex.

By this operation, low clutch $C_L$ is applied and the axial force on secondary pulley 9 exerted by the secondary hydraulic servo 33, on which the relatively high line pressure $P_L$-H acts, is made higher than the axial force on primary pulley 7 produced by the primary hydraulic servo 32, on which the relatively low line pressure $P_L$-L acts. This state corresponds to the low (L) mode in the D range, where torque is transmitted from the secondary pulley 9 to the primary pulley 7, and the axial force on the primary pulley 7 is adjusted by the proper pressure, as regulated by the ratio control valve 57, so that the pulley ratio (torque ratio) is properly changed.

Further, in the high (H) mode in D range, the relatively high line pressure $P_L$-H is supplied to the primary hydraulic servo 32, the relatively low line pressure $P_L$-L is supplied to the secondary hydraulic servo 33 and the line pressure is supplied to the high clutch hydraulic servo $C_H$ as shown in FIG. 13. That is, although the manual valve 59' is maintained at the D range position as in the above case, since the low/high control valve 60' is switched to a high (H) position, the port o communicates with the port y and the port q with the port r and the port s with the port t, respectively, and further the port p communicates with the drain port Ex, as shown in FIG. 11. Therefore, the relatively high regulated pressure (line pressure) $P_L$-H from the primary regulator valve 56 is supplied to the high clutch hydraulic servo $C_H$ through the ports d and e of the manual valve 59' and the ports o and y of the low/high control valve 60' and further to the primary hydraulic servo 32 through the ports m and n of the down-shift relief valve 58, the ports f and i of the manual valve 59' and the ports s and t of the low/high control valve 60'. On the other hand, the relatively low regulated pressure (line pressure) $P_L$-L obtained by further regulating the pressure output from the primary regulator valve 56 is supplied from the output port z thereof to the secondary hydraulic servo 33 through the ports h and g of the manual valve 59' and the ports q and r of the low/high control valve 60'. The hydraulic pressure of the low clutch hydraulic servo $C_L$ is released through the port p and drain port Ex.

By this operation, the high clutch $C_H$ is connected and the axial force on the primary pulley 7 produced by the primary hydraulic servo 32, on which the relatively high line pressure $P_L$-H acts, is made higher than the axial force on the secondary pulley 9 exerted by the secondary hydraulic servo 33 on which the relatively low line pressure $P_L$-L acts. This state corresponds to the high (L) mode where torque is transmitted from the primary pulley 7 to the secondary pulley 9 and since the axial force on the secondary pulley 9 is adjusted by the pressure regulation effected by the ratio control valve 57, the pulley ratio (torque ratio) is properly changed.

In the reverse range (R), the relatively high line pressure $P_L$-H acts on the primary hydraulic servo 32 and the relatively low line pressure $P_L$-L acts on the secondary hydraulic servo 33 and the line pressure acts on the low clutch hydraulic servo $C_L$ as shown in FIG. 13. That is, when the manual valve 59 is switched to a reverse (R) range position, the port d communicates with the port e, the port f with the port g and the port h with the port i and further the low/high control valve 60' is maintained at the aforesaid low (L) position, as shown in FIG. 12.

Therefore, the relatively high regulated pressure (line pressure) $P_L$-H from the primary regulator valve 56 is supplied to the low clutch hydraulic servo $C_L$ through the ports d and e of the manual valve 59' and the ports o and p of the low/high control valve 60' as well as to the primary hydraulic servo 32 through the ports m and n of the down-shift relief valve 58, the ports f and g of the manual valve 59' and the ports q and t of the low/high control valve 60'. On the other hand, the relatively low regulated pressure (line pressure) $P_L$-L from the ratio control valve 57 is supplied to the secondary hydraulic servo 33 through the port h and i of the manual valve 59' and the ports s and r of the low/high control valve 60'. The hydraulic pressure of the high clutch hydraulic servo $C_H$ is discharged from the port y to the drain port Ex.

With this operation, the low clutch $C_L$ is engaged and the relatively high hydraulic pressure $P_L$-H, output by the primary regulator valve 56, acts on the primary hydraulic servo 32 and the relatively low hydraulic pressure $P_L$-L, output by the ratio control valve 57, acts on the secondary hydraulic servo 33 in the CVT unit 11. In the reverse (R) range, although torque is transmitted from the primary pulley 7 to the secondary pulley 9 in the CVT unit 11, the axial force on the primary pulley 7 is made higher than that on the secondary pulley 9 in correspondence with the torque transmission and that axial force on the secondary pulley 9 is adjusted by the pressure regulation effect of the ratio control valve 57 so that the pulley ratio is properly changed.

Further, in neutral (N) range and in park (P), the relatively low hydraulic pressure $P_L$-L acts on the primary hydraulic servo 32 and the relatively low hydraulic pressure $P_L$-L acts on the secondary hydraulic servo 33 as shown in FIG. 13. That is, since the manual valve 59' is switched to the neutral or park position, the port e communicates with the drain port Ex, the port h communicates with the ports g and i and the low/high control valve 60' is maintained at the aforesaid low (L) position.

Therefore, the hydraulic pressure from the output port z of the ratio control valve 57 is supplied from the port h of the manual valve 59' to the primary hydraulic servo 32 through the port g and the ports q and t of the low/high control valve '60 as well as to the secondary hydraulic servo 33 through the port i and the ports s and r of the low/high control valve 60'. Further, the hydraulic pressure of the high clutch hydraulic servo $C_H$ is discharged from the port y of the low/high control valve 60' to the drain port Ex and the hydraulic pressure of the low clutch hydraulic servo $C_L$ is discharged through the ports p and o of the low/high control valve 60', the port e of the manual valve 59' and the drain port Ex in this state.

With this operation, both the low and high clutches $C_L$, $C_H$ are shut off and the same hydraulic pressure from the ratio control valve 57 acts on both the primary hydraulic servo 32 and the secondary hydraulic servo 33 having the same pressure-receiving areas, so that approximately the same axial forces act on both the primary and secondary pulleys 7, 9.

When a down-shift operation is executed, the down-shift relief valve 58 is switched to cause the port n to communicate with the drain port Ex, and thus the hydraulic pressure of the hydraulic servo which had been receiving the higher hydraulic pressure is reduced to become lower than the hydraulic pressure of the hydraulic servo which had been receiving the lower hydraulic pressure.

Figure 14:
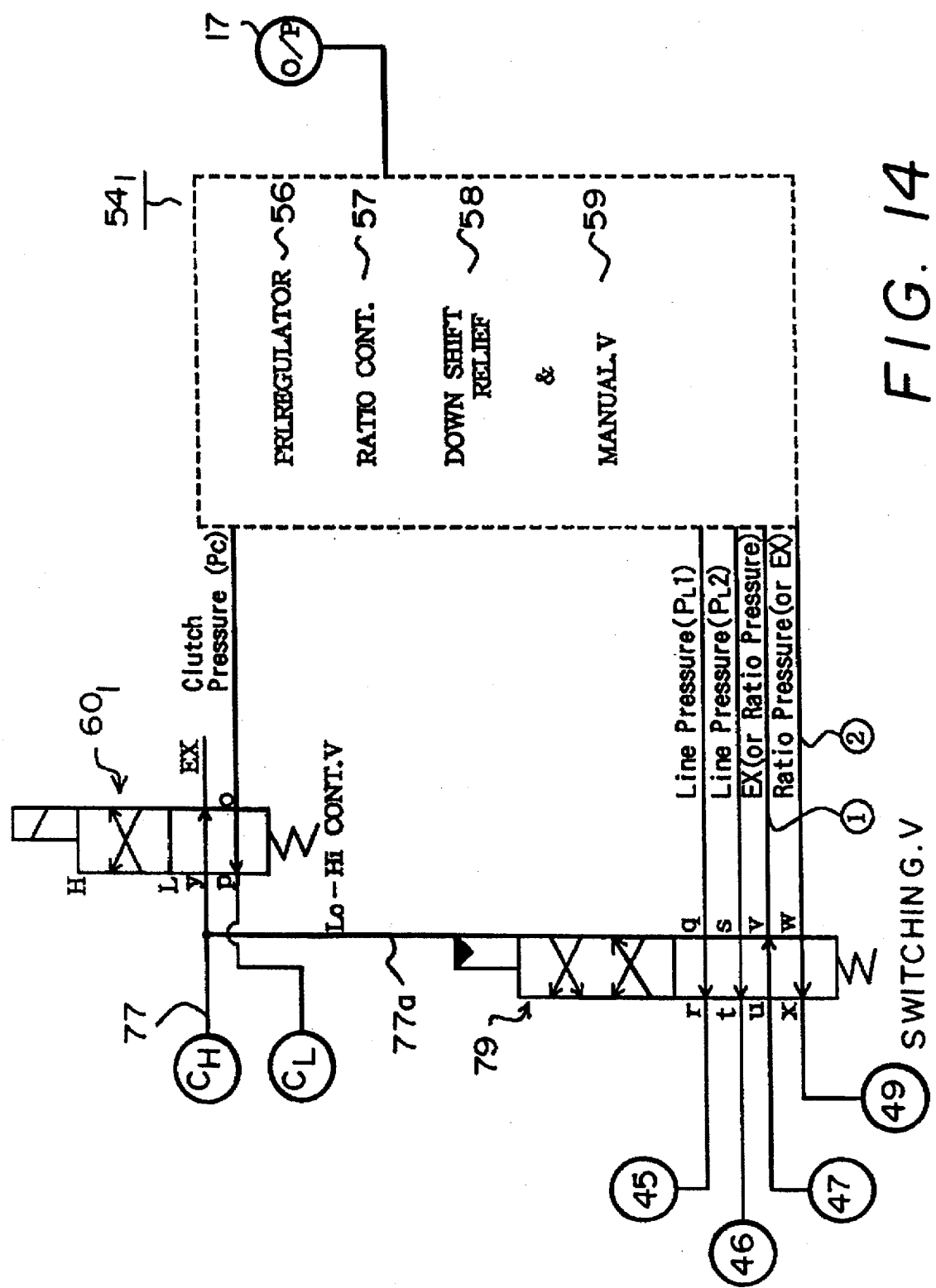
FIG. 14 is a diagram of a partially modified hydraulic control unit applicable to the double chamber type hydraulic servos of FIG. 4.

The embodiment of a hydraulic control unit depicted in FIG. 14 is designed for control of a so-called double chamber type control servo mechanism including primary and secondary hydraulic servos 32, 33 as shown in FIG. 4, that is, having the first and second hydraulic chambers 45, 46, 47, 49. Although the primary regulator valve 56, ratio control valve 57, down-shift relief valve 58 and manual valve 59 used in this embodiment are similar to those of the embodiments shown in FIG. 5 to FIG. 7, a low/high control valve 601 is provided in the form of a simple 2-position-switching solenoid valve with 4 ports. A pilot oil passage 77a branches from an oil passage 77 from the port y of the low/high control valve 601 and connects to a high clutch servo $C_H$. A switching valve 79 is switched by a pilot pressure.

In the low (L) mode in the D range, since the low/high control valve 60₁ is in the low position, a port o communicates with a port p and a port y with a drain port Ex. Further, since the switching valve 79 is positioned as illustrated with the oil passage 77 in communication with the drain port Ex, a port q communicates with a port r, a port s with a port t, a port u with a port v and a port w with a port x. With the manual valve 59 in the D range position, the ratio pressure from the ratio control valve 57 is introduced to an oil passage (2) and an oil passage (1) communicates with the drain port Ex.

Therefore, the clutch pressure Pc from the manual valve 59 is supplied to a low clutch hydraulic servo $C_L$ through the ports o and p of the low/high control valve 60₁ and the first and second line pressures $P_L1$, $P_L2$ from the manual valve are supplied to the first hydraulic chamber 45 of the primary hydraulic servo 32 and the first hydraulic chamber 46 of the secondary hydraulic servo 33 through the ports q, r, s, t of the switching valve 79. Further, the ratio pressure from the manual valve is supplied to the second hydraulic chamber 49 of the secondary hydraulic servo 33 through the oil passage (2) and the ports w and x of the switching valve 79 and the hydraulic pressure of the second hydraulic chamber 47 of the primary hydraulic servo 32 communicates with the drain port Ex of the manual valve through the ports u and v and the oil passage (1).

In this state, the low clutch $C_L$ is engaged and the axial force on the secondary pulley 9 becomes higher than that on the primary pulley 7 due to the ratio pressure acting on the second hydraulic chamber 49 of the secondary hydraulic servo 33, in accordance with the direction in which torque is transmitted in the CVT unit 11.

Further, in the high (H) mode in the D range, since the low/high control valve 60₁ is switched to the high (H) position, the port o communicates with the port y and the port p with the drain port Ex. Since the switching valve 79 is switched by the pilot pressure from the oil passage 77a, in the state where the clutch pressure Pc is supplied, to the oil passage 77 through the ports o and y, the port q communicates with the port t, the port s with the port r, the port x with the port v and the port w with the port u.

Therefore, the clutch pressure Pc is supplied to the high clutch hydraulic servo $C_H$ through the ports o and y of the low/high control valve 60₁ and the line pressures $P_L1$ and $P_L2$ are supplied to the first hydraulic chamber 46 of the secondary hydraulic servo 33 through the ports q and t of the switching valve 79 as well as to the first hydraulic chamber 45 of the primary hydraulic servo 32 through the ports s and r. Further, the ratio pressure from the manual valve 59 is supplied to the second hydraulic chamber 47 of the primary hydraulic servo 32 through the oil passage (2) and the ports w and u and the hydraulic pressure of the second hydraulic chamber 49 of the secondary hydraulic servo 33 is discharged from the drain port of the manual valve 59 through the ports x and v and oil passage In this state, the high clutch $C_H$ is engaged and the axial force on the primary pulley 7 produced by the primary hydraulic servo 32, in which the ratio pressure acts on the second hydraulic chamber 47, is made higher than that of the secondary pulley 9, in accordance with the direction in which torque is transmitted in the CVT unit 11.

In the reverse (R) range, the manual valve 59 is switched and the low/high control valve 60₁ is maintained at the low (L) position as shown in FIG. 7. Therefore, the switching valve 79 is maintained at the lower position shown in the drawing as described above. Further, the ratio pressure is supplied to the oil passage (1) by switching the switching valve 79 and the oil passage (2) communicates with the drain port Ex.

Therefore, the clutch pressure Pc is supplied to the low clutch hydraulic servo $C_L$ through the ports o and p and the first and second line pressures are supplied to the first hydraulic chamber 5 of the primary hydraulic servo through the ports q and r as well as to the first hydraulic chamber 46 of the secondary hydraulic servo through the ports s and t. Further, the ratio pressure fed through the manual valve 59 is supplied to the second hydraulic chamber 47 of the primary hydraulic servo through the oil passage (1) and the ports v and u and the hydraulic pressure of the second hydraulic chamber of the secondary hydraulic servo is discharged from the drain port Ex of the manual valve 59 through the ports x and w and the oil passage (2).

In this state, the low clutch $C_L$ is engaged and the axial force on the primary pulley 7 caused by the primary hydraulic servo 32, in which the ratio pressure acts on the second hydraulic chamber 47, is made higher than that on the secondary pulley 9, in accordance with the direction in which torque is transmitted in the CVT unit 11.

Figure 15:
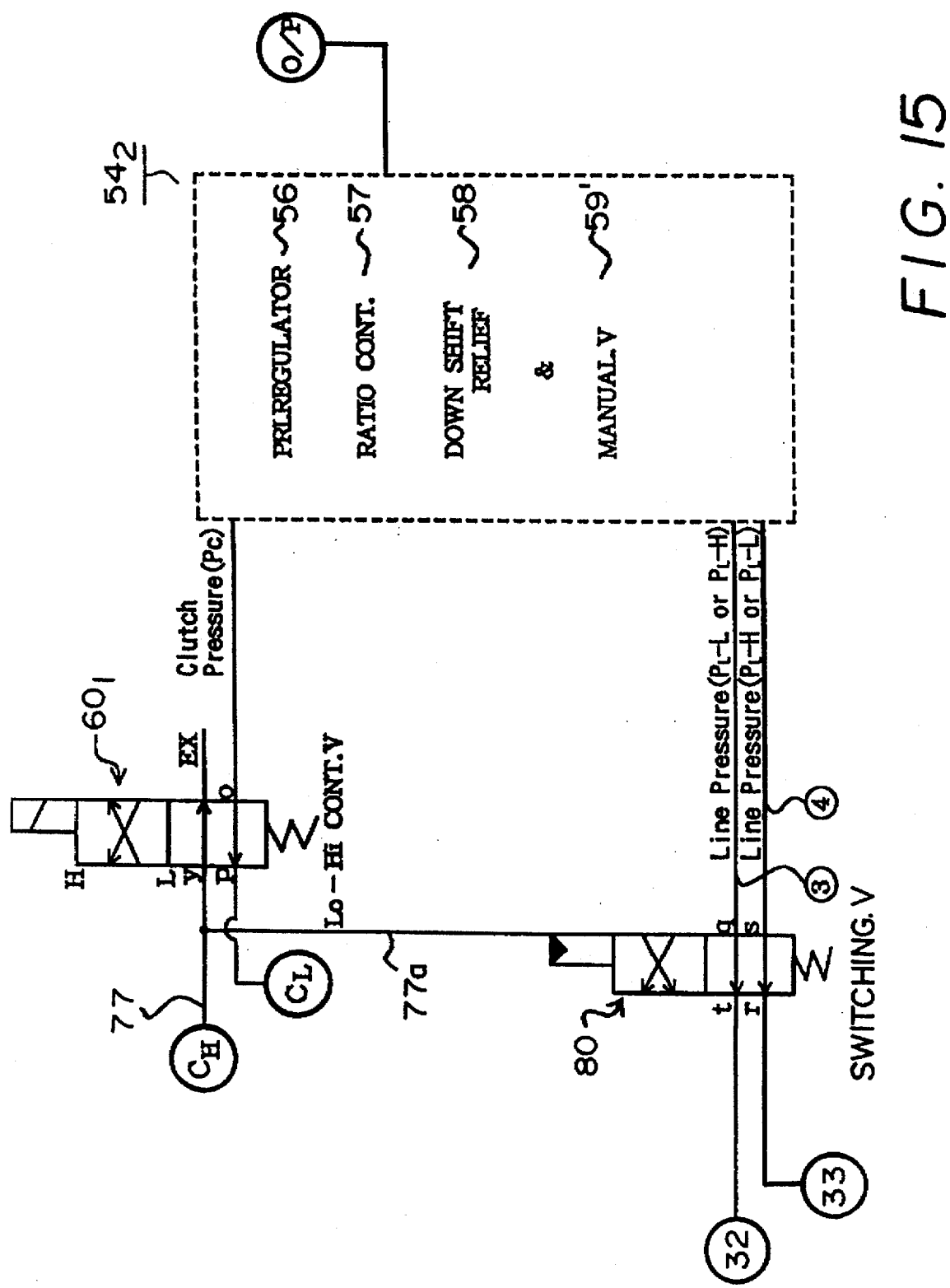
FIG. 15 is a diagram of another embodiment of a partially modified hydraulic control unit applicable to the double chamber type hydraulic servos.

The hydraulic control unit 542 shown in FIG. 15 is designed to control a so-called double regulator type control mechanism having primary and secondary hydraulic servos 32, 33 as shown in FIG. 9, that is, each one of hydraulic chambers 73 and 75 have the same pressure-receiving areas for receiving different hydraulic pressures. The primary regulator valve 56, ratio control valve (secondary regulator valve) 57, down-shift relief valve 58 and manual valve 59' of this embodiment are similar to those of the embodiments shown in FIG. 10 to FIG. 12. However, in this embodiment low/high control valve 60₁ is provided in the form of a simple 2-position-switching solenoid valve with 4 ports and a switching valve 80 is provided for switching a hydraulic pressure from the port y of the valve 60₁ to the high clutch hydraulic servo $C_H$ as a pilot pressure.

In the low (L) mode in D range, since the low/high control valve 60₁ is located at the low (L) position, the port o communicates with the port P and the port y with the drain port Ex. Further, since the switching valve 80 is located at the position shown in the drawing, the oil passage 77 communicates with the drain port Ex, the port q with the port t and the port s with the port r. Since the manual valve 59' is located at the D range position, the relatively high line pressure $P_L$-H from the primary regulator valve 56 is introduced to an oil passage (4) and the relatively low line pressure $P_L$-L from the ratio control valve 57 is introduced to an oil passage (3).

Therefore, the clutch pressure Pc from the manual valve 59' is supplied to the low clutch hydraulic servo $C_L$ through the ports o and p of the low/high control valve 60₁, the relatively low line pressure $P_L$-L from the oil passage (3) is supplied to the primary hydraulic servo 32 through the ports q and t of the switching valve 80 and the relatively high line pressure $P_L$-H from the oil passage (4) is supplied to the hydraulic servo 33 through the ports s and r.

In this state, the low clutch $C_L$ is engaged and the axial force on the secondary pulley 9 produced by the hydraulic servo 33, on which a somewhat higher line pressure acts, is raised above that of the primary pulley 7 in accordance with the direction in which torque is transmitted in the CVT unit 11 as previously described.

Further, in the high (H) mode in the D range, since the low/high control valve 60₁ is switched to the high (H) position, the port o communicates with the port y as well as the port p with the drain port Ex. Since the switching valve 80 is switched by the pilot pressure from the oil passage 77a when the clutch pressure $P_L$ is supplied to the oil passage 77 through the ports o and y, the port q communicates with the port r and the port s with the port t.

Therefore, the clutch pressure Pc is supplied to the high clutch hydraulic servo $C_H$, the relatively low line pressure $P_L$-L from the oil passage (3) is supplied to the secondary hydraulic servo 33 through the ports q and r of the switching valve 80 and the relatively high line pressure $P_L$-H from the oil passage (4) is supplied to the primary hydraulic servo 32 through the ports s and t.

In this state, the high clutch $C_H$ is engaged and the axial force of the primary pulley 7 produced by the hydraulic servo 32, on which a somewhat higher line pressure acts, is raised above that on the secondary pulley 9, in accordance with the direction in which torque is transmitted in the CVT unit 11.

In the reverse (R) range, the manual valve 59' is switched and the low/high control valve 601 is maintained at the low (L) position as shown in FIG. 12. Therefore, the switching valve 80 is maintained at the lower position shown in the drawing. In addition, the switching of the manual valve 59' causes the relatively high line pressure $P_L$-H from the primary regulator valve 56 to be introduced to the oil passage (3) and the relatively low pressure line pressure $P_L$-L to be introduced to the oil passage (4) from the ratio control valve 57. Further, the relatively low line pressure $P_L$-L from the ratio control valve is introduced to the oil passage (4). Therefore, the clutch pressure $C_L$ is supplied to the low clutch hydraulic servo $C_L$ through the ports o and p, the somewhat higher line pressure $P_L$-H from the oil passage (3) is supplied to the primary hydraulic servo 32 through the ports q and t and the somewhat lower line pressure $P_L$-L from the oil passage (4) is supplied to the secondary hydraulic servo 33 through the ports s and r.

In this state, the low clutch $C_L$ is engaged and the axial force on the primary pulley 7 produced by the hydraulic servo 32, on which a somewhat higher line pressure $P_L$-H acts, is raised above that on the secondary pulley 9, in accordance with the direction in which torque is transmitted in the CVT unit 11.

Figure 16:
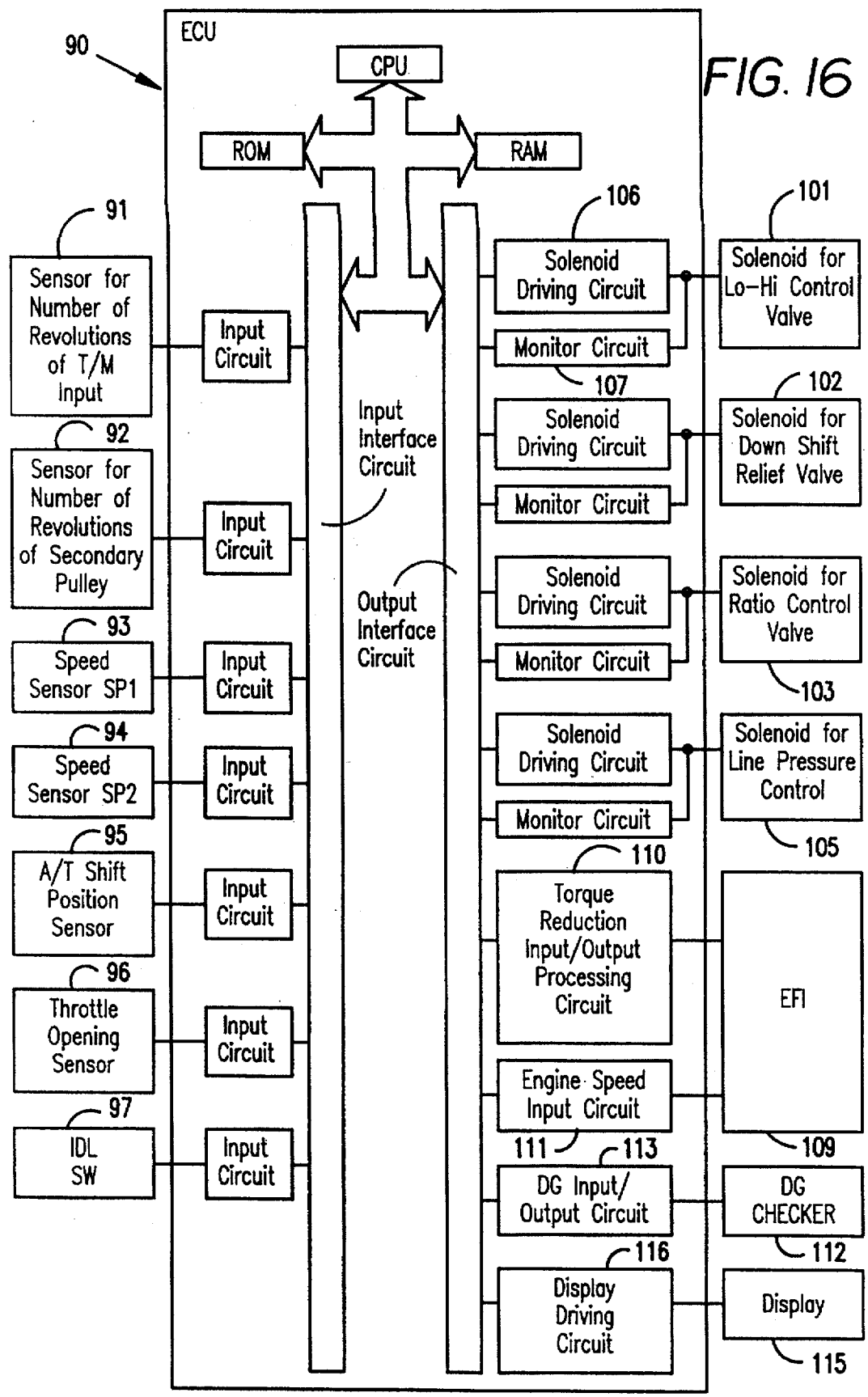
FIG. 16 is a block diagram showing an electric control unit for controlling the embodiment of FIG. 1(a)

FIG. 16 is a block diagram of an electronic control unit (EUC) 90, wherein numeral 91 denotes a sensor within the continuously variable transmission system 1 for detecting the r.p.m. of the input shaft 2 thereof, numeral 92 denotes a sensor for detecting the r.p.m. of the secondary pulley 9 of the CVT unit 11, numeral 93 denotes a vehicle speed sensor for detecting the r.p.m. of the output shaft 5 of the continuously variable transmission and numeral 94 denotes a similar vehicle speed sensor, used for a signal of a speed meter as well as a backup device for when the vehicle speed sensor 93 fails. Numeral 95 denotes a sensor for detecting where, among the shift positions P, R, N, D, the shift lever or the manual valve of the continuously variable transmission is located, numeral 96 denotes a sensor composed of a potentiometer disposed in the engine for detecting throttle opening and numeral 97 denotes a sensor disposed in the throttle opening sensor 96 for detecting whether or not the accelerator is in an entirely closed state. The signals from the above respective sensors are received by a CPU, a ROM or a RAM through an input processing circuit and an input interface circuit, respectively.

Numeral 101 denotes a solenoid for the low/high control valve 60 for switching between the low (L) mode and the high (H) mode and the solenoid executes ON/OFF operation. Numeral 102 denotes a solenoid used for the downshift relief valve 58 for draining a high pressure side circuit and composed of a duty or linear solenoid. Numeral 103 denotes a solenoid used for operating the ratio control valve 57 to regulate speed change by control of hydraulic pressure and composed of a duty or linear solenoid. Numeral 105 denotes a solenoid used for operating the primary regulator valve 56 for controlling a line pressure and composed of a linear solenoid. The above respective solenoids are driven through a solenoid drive circuit 106 for generating a predetermined voltage or output based on the signals from an output interface circuit, respectively, and the operations of the respective solenoids are checked by a monitor circuit 107 to determine their failure and for self-diagnosis in the event of a failure.

Numeral 109 denotes an electronic control unit for controlling the engine and numeral 110 denotes a circuit for issuing a signal for temporarily reducing torque generated by the engine by delaying the ignition timing angle, shutting off fuel supply etc., to ease shock in speed change. Numeral 111 denotes a processing circuit for inputting engine r.p.m. Numeral 112 denotes a checker composed of an indicator lamp and the like for outputting the result of self-diagnosis when the electronic control unit 90 fails and numeral 113 denotes a circuit for outputting the result of the self-diagnosis in the above failure. Numeral 115 denotes a display unit, e.g. including low (L) mode and high (H) mode display lamps and the like, for displaying the state of the continuously variable transmission and numeral 116 denotes a drive circuit for driving the display unit 115.

Figure 17:
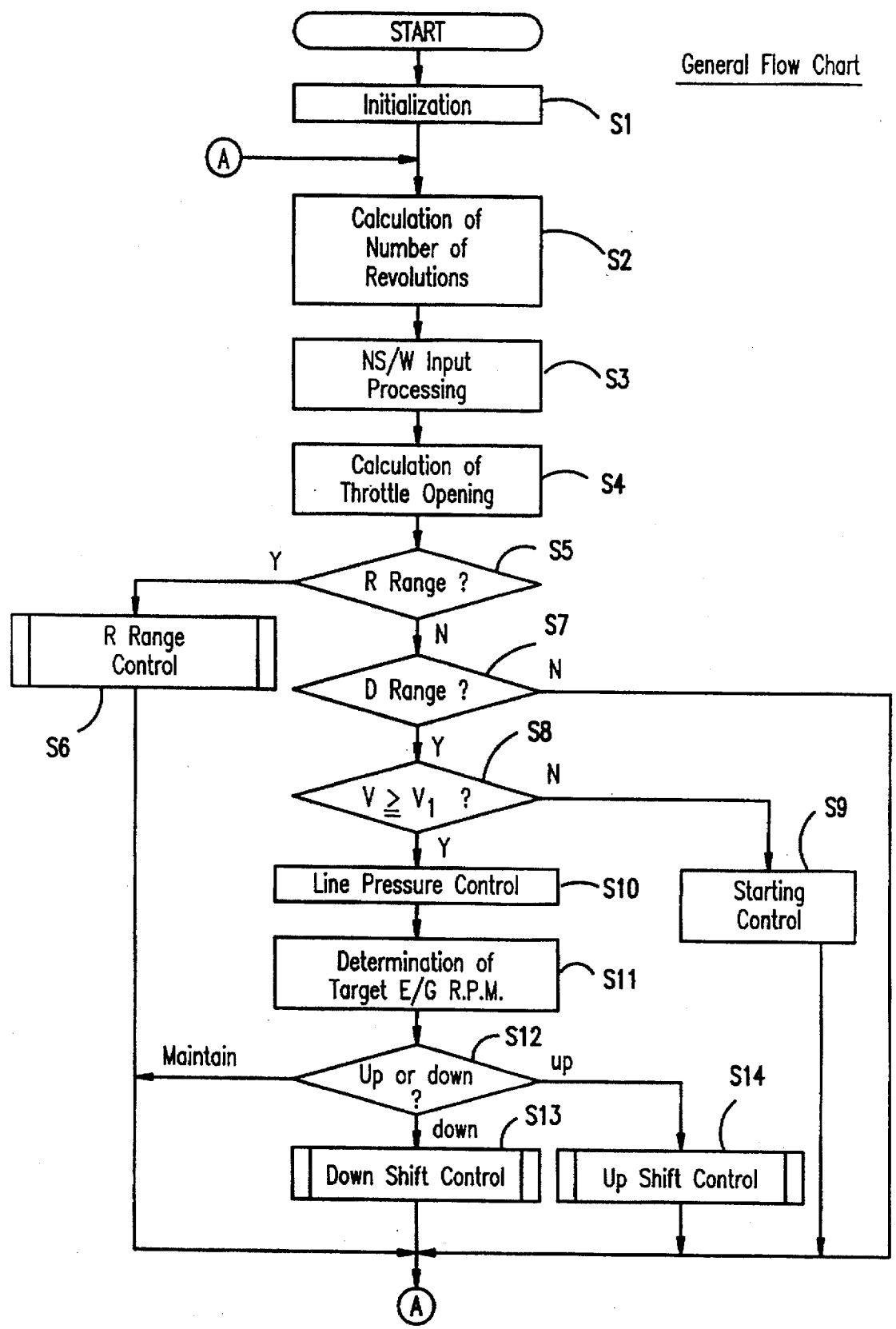
FIG. 17 is a flowchart of a main routine used by the electric control mechanism.

FIG. 17 is a flowchart of the main routine for control of the continuously variable transmission, wherein all the Steps are initialized at the beginning, in Step S1. At Step 2, r.p.m. is calculated based on the signals from the above r.p.m. sensors 91, 92 and 93. The signal from a neutral start switch is processed, shift position is read at step S3 and throttle opening is calculated at Step S4. Then, in step S5 whether or not the manual valve is located in the reverse (R) position is determined based on the above step S3, and when the determination is YES, an R range control subroutine is executed (Step S6). When the determination is NO, whether or not the D range has been selected is determined (Step S7), and when the D range is selected, it is determined whether or not current vehicle speed V is equal to or less than a predetermined vehicle speed V1 (for example, 5 Km/h) (Step S8). When the current vehicle speed is equal or less than the vehicle speed, start control is executed (step S9), whereas when it is greater than the predetermined vehicle speed, line pressure control is executed to set a line pressure depending on whether the low (L) mode or the high (H) mode is selected, on the throttle opening and on the pulley ratio (step S10). Further, a target engine r.p.m. is read and determined from the map of a preset optimum fuel efficiency curve based on the throttle opening at Step S11. Then, a down-shift, an up-shift or maintaining of the current state is selected by comparing the current engine r.p.m. with the above target engine r.p.m. (Step S12) and the down-shift control subroutine (step S13) or the up-shift control subroutine (Step S14) is executed, as appropriate.

Figure 18:
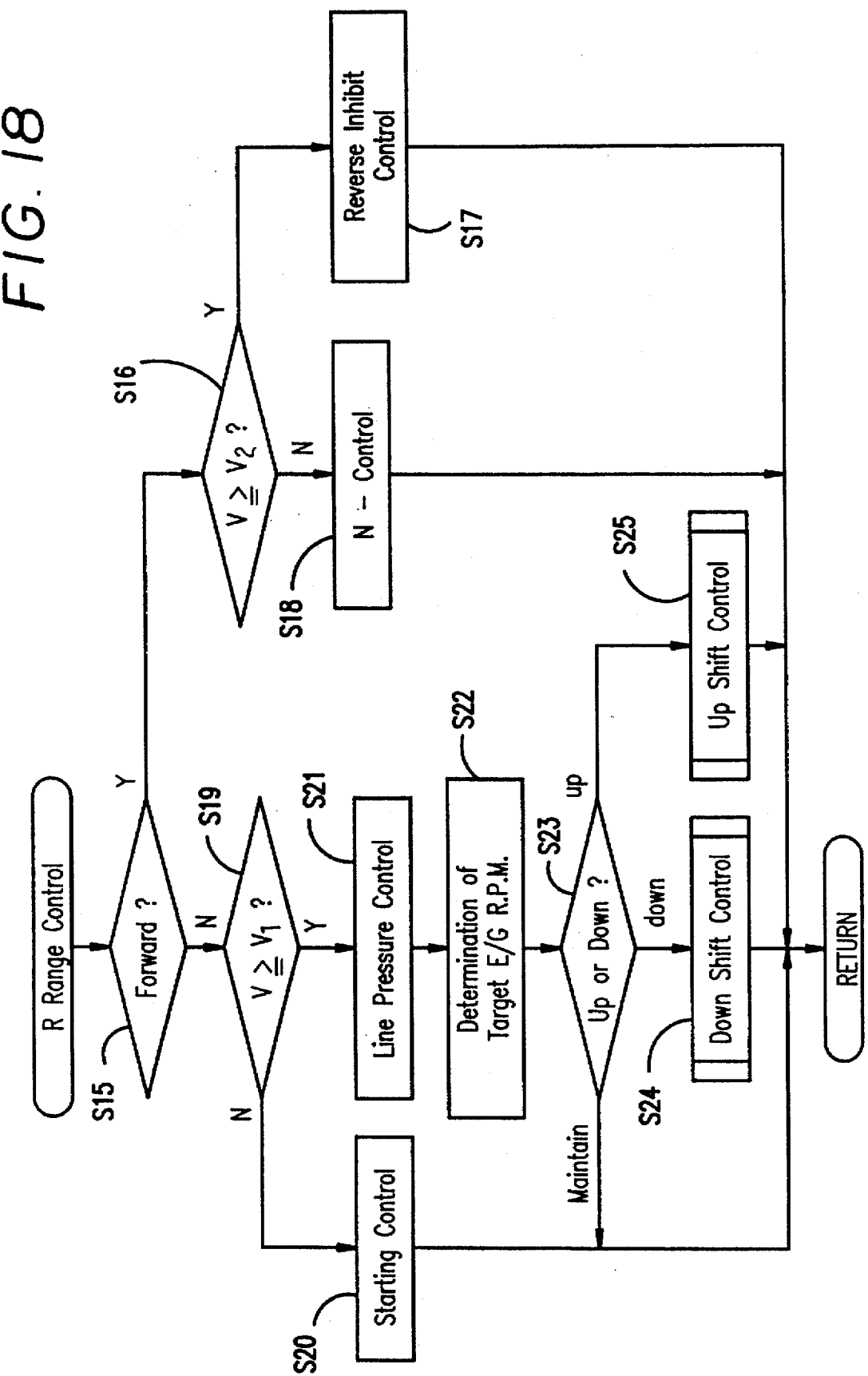
FIG. 18 is a flowchart of a reverse (R) range control subroutine (step S6 in FIG. 17)

FIG. 18 is a flowchart of the subroutine for reverse (R) range control. Whether or not the vehicle is travelling forward is first determined from the pulley ratio and vehicle speed at step S15. When the vehicle is travelling forward, whether or not the current vehicle speed V is greater than a predetermined vehicle speed V2 (for example, 5 Km/h) is determined (step S16). When the current vehicle speed is greater than the predetermined vehicle speed, control prohibiting reverse operation is executed by, for example, the release of both the low clutch $C_L$ and high clutch $C_H$, or the like (Step S17), whereas when the vehicle speed is lower than the predetermined vehicle speed, neutral (N) control is executed (step S18).

In neutral control, the axial forces on the primary pulley 7 and secondary pulley 9 are controlled to be substantially equal. Otherwise, at the minimum, the difference between the axial force on the primary pulley and the axial force on the secondary pulley is controlled to remain less than that difference between the axial forces on the two pulleys which is determined by the input torque of the CVT and the pulley ratio at the time when output torque is in a positive direction and within a range in which the relative relationship of the magnitudes of the axial forces is not reversed. Alternatively, the difference between these axial forces is controlled so as to be less than that difference between the axial forces on the primary and secondary pulleys which is determined by the input torque of the CVT unit and the pulley ratio at the time when the output torque is in a negative direction and within a range in which the relative relationship of the magnitudes of the axial forces is not reversed. More specifically, in the double chamber type control mechanisms 54, 54₁ shown in FIG. 4 to FIG. 7 and FIG. 14, the hydraulic pressures in both of the second chambers 47, 49 of the primary and secondary hydraulic servos 32, 33 are released while hydraulic pressures are supplied to both the first hydraulic chambers 45, 46 of the primary and secondary hydraulic servos 32, 33 so as to equalize the axial forces on the pulleys 7 and 9. Further, in the double regulator type control mechanisms 54' and 542 shown in FIG. 9 to FIG. 12 and FIG. 15, equal hydraulic pressures are supplied to both the primary and secondary hydraulic servos 32 and 33 by entirely opening the ratio control valve (secondary regulator valve) 57 so as to equalize the axial forces on both of the pulleys 7 and 9. With these operations, the CVT unit 11 adjusts itself so that the output from the output shaft 5 becomes zero, regardless of the r.p.m. of the output shaft, and is stably maintained at the neutral position where the r.p.m. of the output shaft 5 is zero. Neutral control as described in the specification and drawings of Japanese Patent application Laid-Open No. 7-66234 is applicable to this embodiment as is.

When it is determined that the vehicle is travelling in reverse at step S15, the current vehicle speed V is compared with the predetermined vehicle speed V1 (for example, 5 Km/h) (Step S19) and when the current vehicle speed V is smaller than the predetermined vehicle speed V1, start control is executed (Step S20), whereas when the current vehicle speed V is greater than the predetermined vehicle speed V1, line pressure control sets a line pressure based on the throttle opening and pulley ratio (Step S21). Further, a target engine r.p.m. is determined by reading a map as previously described (refer to step S10) at Step S22. Then, either an up-shift, a down-shift or maintenance of the current state is selected, as in the above step S12, (Step S23) and the down-shift control subroutine (step S24) or the up-shift control subroutine (Step S25) is executed, if appropriate.

Figure 23:
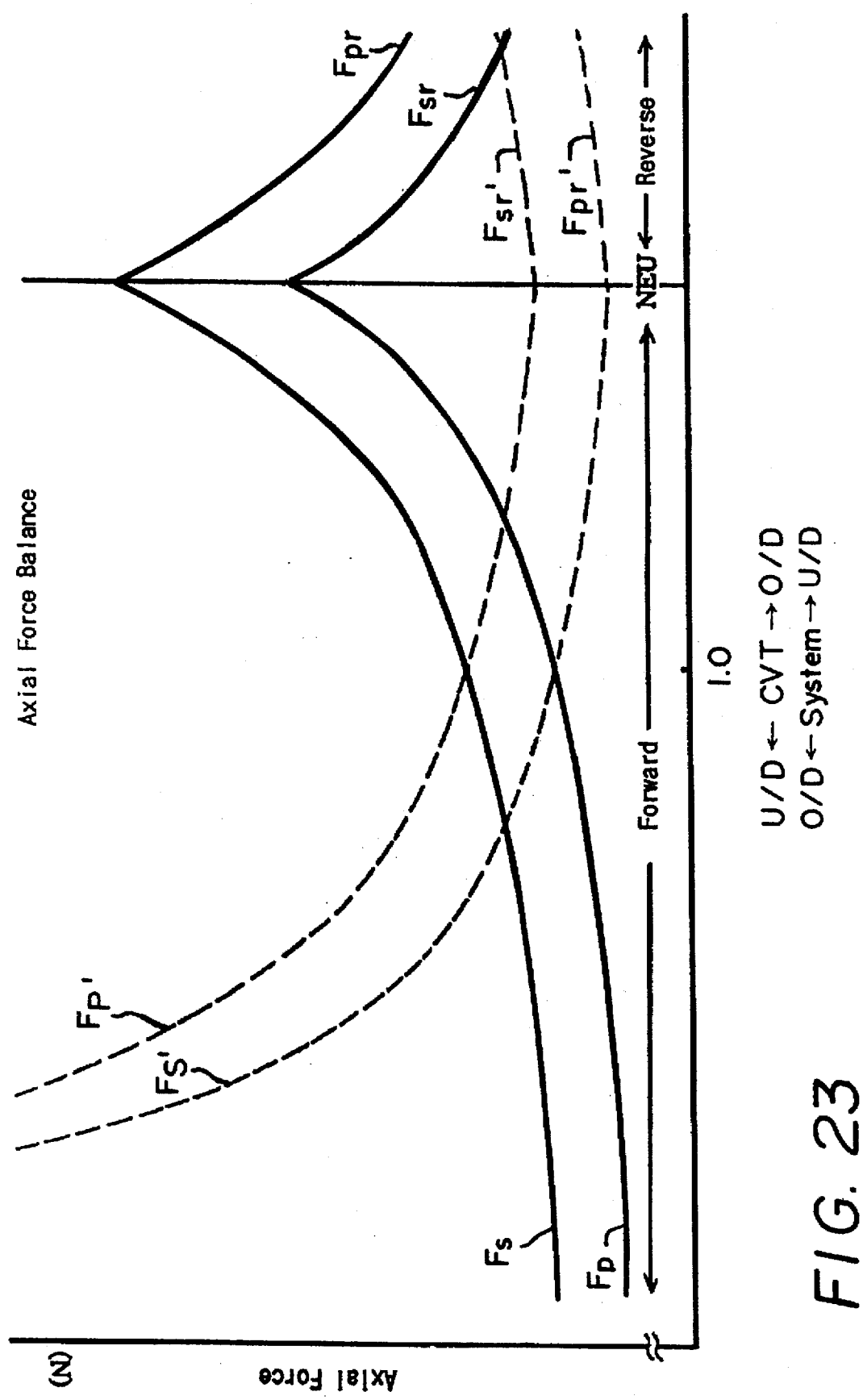
FIG. 23 is a graph of axial force versus CVT and system gear ratios, showing the balance between the axial forces on the primary and secondary pulleys.

The CVT unit 11 is located at the O/D end of the transmission system and the speed increasing rotation output by the CVT unit to the sun gear 19s is synthesized, within the planetary gear unit 19, with the constant speed transmitted from the power transmission unit 26 to the carrier 19c and a reverse rotation is output at the output shaft 5 integrally rotating with the ring gear 19r. At this time, however, the torque output from the CVT unit 11 is reversed across the neutral position (where output from the output shaft 5 is zero), with torque circulation, while power is transmitted from the primary pulley 7 to the secondary pulley 9 in the CVT unit 11 as shown in FIG. 2. In reverse control, the manual valves 59, 59' are located at the reverse (R) position as shown in FIG. 7, FIG. 8, FIG. 12, FIG. 13, FIG. 14, FIG. 15 and the hydraulic pressure of the hydraulic servo 32 is set higher than that of the hydraulic servo 33 when positive torque is transmitted (transmitted to the engine and wheels). Consequently, the axial force Fpr of the primary pulley 7 is made higher than the axial force Fsr of the secondary pulley 9 as shown in FIG. 23 so that the relationship of the axial forces corresponds to the torque transmission direction. In this state, the axial forces Fpr and Fsr on both the pulleys 7, 9 are adjusted to properly change speed under control of the ratio control valve 57.

Figure 19:
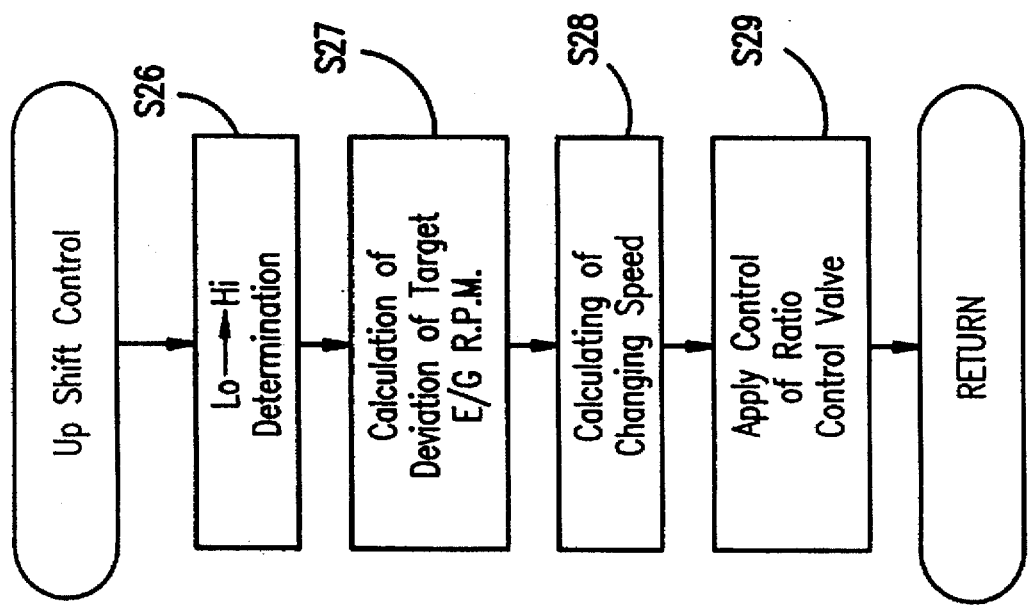
FIG. 19 is a flowchart of an up-shift control subroutine (step S14—FIG. 17)

FIG. 19 is a flowchart for up-shift control in the D range shown at step S14, wherein it is determined whether a speed is to be changed from the low (L) mode to the high (H) mode at step S26. Note that R range control is not executed at Step S26. Further, the difference between the current engine r.p.m. and a target engine r.p.m. and the acceleration of the difference are calculated (Step S27) and a speed changing speed is calculated based on that calculated difference (Step S28), whereby application control by the ratio control valve 57 is executed (step S29).

Figure 20:
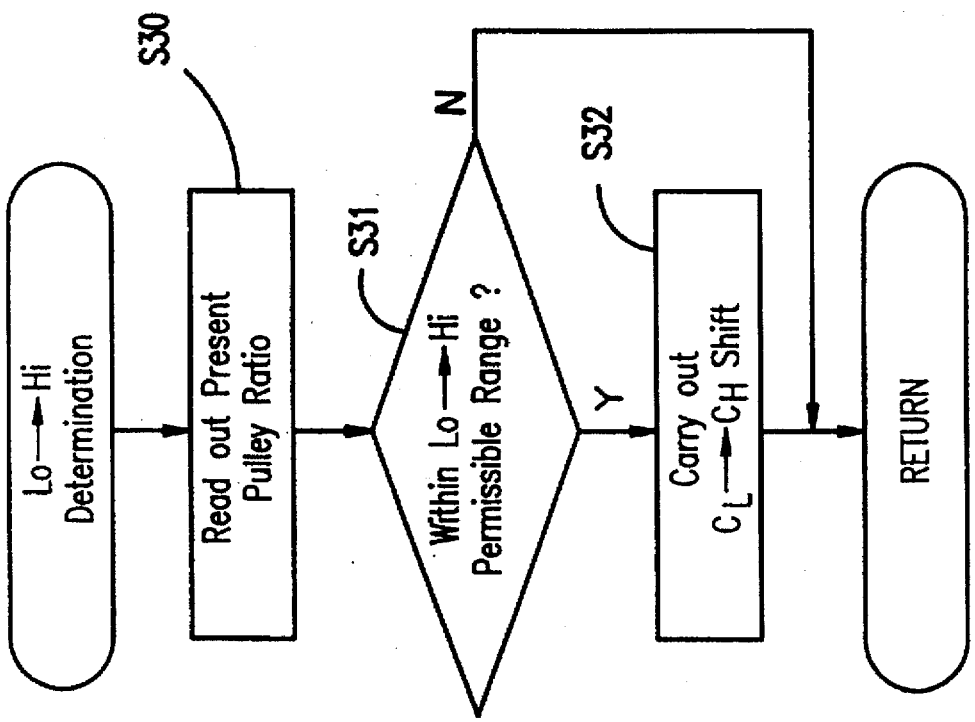
FIG. 20 is a flowchart of a Lo→Hi determining subroutine (step S26—FIG. 19)

FIG. 20 is a subroutine for determination of Lo→Hi in the above Step S26. At step S30, a pulley ratio is calculated based on the signals from the r.p.m. sensors 91, 92 for the primary pulley 7 and secondary pulley 9. Then, it is determined whether the pulley ratio is within the range in which a speed change from the low mode to the high mode is permitted (step S31) and, when the pulley ratio is within that range, the low/high control valve 60 is switched to thereby disengage the low clutch $C_L$ and engage the high clutch $C_H$ (Step S32).

Figure 21:
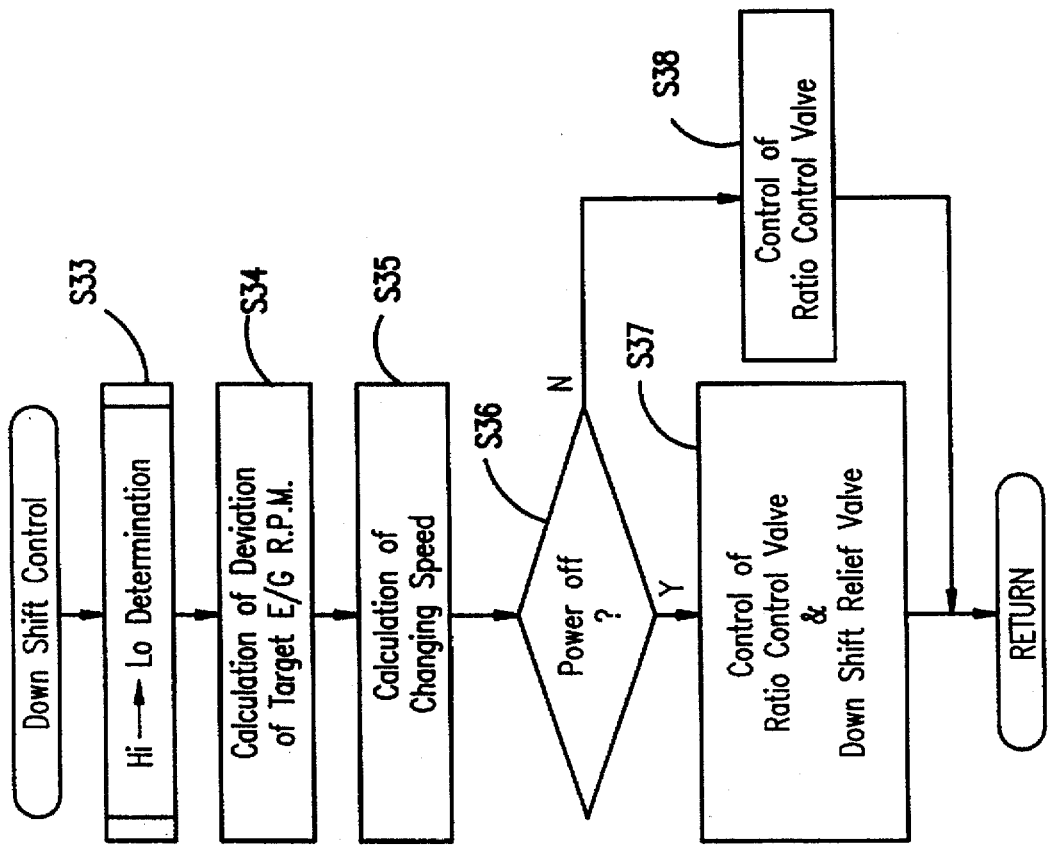
FIG. 21 is a flowchart of a down-shift control subroutine (step S13—FIG. 17)

FIG. 21 is a flowchart of down-shift control shown at step S13, wherein it is determined at step S33 whether or not a speed change from the high (H) mode to the low (L) mode is to be executed (this determination is not made in the R range control). Further, the difference between current engine r.p.m. and a target engine r.p.m. and the acceleration of the difference are calculated (step S34) and a speed changing speed is calculated based on that calculated difference (Step S35). Further, whether or not the down-shift is to be a power-off down-shift is determined based on the signals from the throttle opening sensor 96 and idle switch 97 (Step S36). Then, when a state of coasting is achieved by power-off, that is, by releasing depression of an accelerator pedal, or the like, the ratio control valve 57 is controlled as well as the down-shift relief valve 58 is controlled (Step S37), whereas when down-shift is executed in a power-on state, that is, in an accelerated state in which the accelerator pedal is abruptly depressed, the ratio control valve 57 is controlled (step S38).

The coast state is a negative torque state in which torque is transmitted from the wheels to the engine. In the negative torque state, however, the relative relationship in magnitude between the axial force Fp' (Fpr') of the primary pulley 7 and the axial force Fs' (Fsr') of the secondary pulley 9 is the reverse of that of the axial forces Fp, Fs (Fpr, Fsr) in positive torque transmission as indicated by the dash lines and the solid lines of FIG. 23. At this time, since the down-shift relief valve 58 is drained in the double chamber type control mechanism 54 shown in FIG. 5, the first hydraulic chamber 46 of the secondary hydraulic servo 33 is released, whereby the axial force Fp' on the primary pulley 7 is made higher than the axial force Fs' on the secondary pulley 9 and thus the speed change operation of the CVT unit 11 is executed by the proper adjustment of the ratio control valve 57.

Further, in the double regulator type control mechanism 54' shown in FIG. 10, since the down-shift relief valve 58 is drained, the secondary hydraulic servo 33 is released, whereby the axial force Fp' on the primary pulley is made higher than the axial force Fs' on the secondary pulley.

Although an oil supply passage to the primary hydraulic servo 32 is reversed from that to the secondary hydraulic servo 33 when the manual valve is in the reverse (R) position shown in FIG. 7 and FIG. 11, the pressure of the hydraulic servo having a higher hydraulic pressure is reduced so that the axial force Fsr' on the secondary pulley is made higher than the axial force Fpr' on the primary pulley.

Down shift control executed at step S38 when power is turned on will now be described. Since the ratio control valve 57 is controlled in a pressure reducing direction in the double chamber type control mechanism 54 shown in FIG. 5, the hydraulic pressure of the secondary hydraulic servo 33 is made relatively smaller than that of the primary hydraulic servo 32, whereas since the ratio control valve 57 is controlled in a pressure increasing direction in the double regulator type control mechanism 54' shown in FIG. 10, the hydraulic pressure of the secondary hydraulic servo 33 is made relatively smaller than that of the primary hydraulic servo 32. With this operation, since the ratio of the axial force Fs of the secondary pulley and the axial force Fp of the primary pulley is reduced, the speed of the CVT unit 11 is abruptly changed in a speed increasing (O/D) direction and thus the speed of the entire transmission system 1 is abruptly changed in a speed reducing (U/D) direction.

Figure 22:
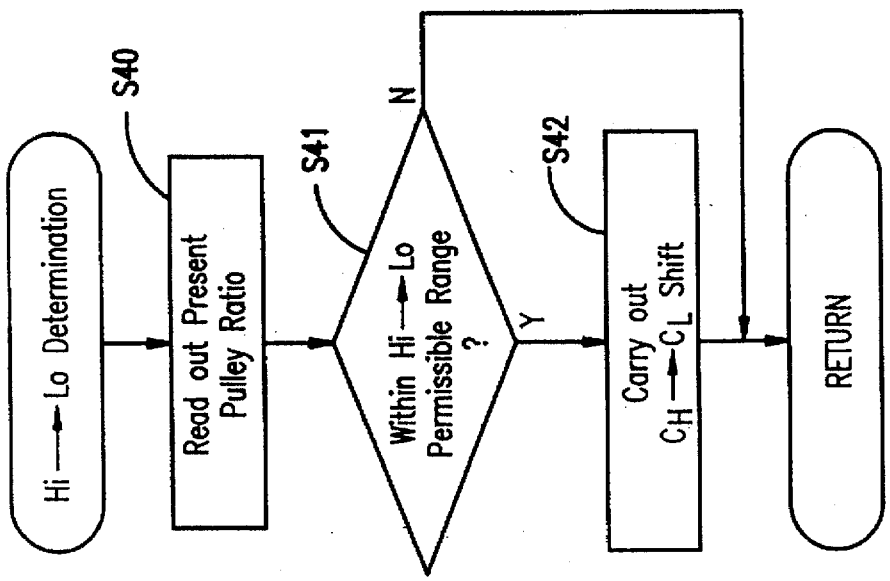
FIG. 22 is a flowchart of a Hi→Lo determining subroutine (step S33—FIG. 21)

FIG. 22 shows a subroutine for determining Hi→Lo in the above step S33. A current pulley ratio is read based on the signals from the r.p.m. sensors of the primary pulley 7 (= input shaft 3) and secondary pulley 9 (step S40) and it is determined whether the pulley ratio is within the range in which a speed change is permitted from the high mode to the low mode (step S41). When the pulley ratio is within that range, the low/high control valve 60 is switched so as to change the engagement from the high clutch $C_H$ to the low clutch $C_L$ (step S42). The speed is changed between the low (L) mode and high (H) mode by the change of engagement of the low clutch $C_L$ and high clutch $C_H$ executed at the above steps S32 and S42. In the low mode, a positive rotation is taken out from the output shaft 5 by the aforesaid synthesization of both rotational inputs of the power transmission unit 26 and CVT unit 11 executed by the planetary gear 19. At this time, power is transmitted from the secondary pulley 9 to the primary pulley 7 with torque circulation in the CVT unit 11. On the other hand, in the high mode, since the rotation output from the CVT unit 11 is transmitted to the output shaft 5 as is, power is transmitted from the primary pulley 7 to the secondary pulley 9 in the CVT unit 11.

At this time, the hydraulic pressures of the primary hydraulic servo 32 and secondary hydraulic servo 33 are switched by switching the low/high control valves 60, 60' and 601 as shown in FIG. 6, FIG. 11, FIG. 14 and FIG. 15. With this operation, the axial force Fs of the secondary pulley 9 is made higher than the axial force Fp of the primary pulley 7 in the low mode and the axial force of the primary pulley is made higher than that of the secondary pulley in the high mode in order to coincide with the direction of power transmission. Note that the above description relates to the transmission of positive torque and this is reversed in the transmission of negative torque by the down-shift relief valve as described above.

Next, a modified example of the power transmission mechanism of the continuously variable transmission will be described with reference to FIG. 24.

Figure 24A:
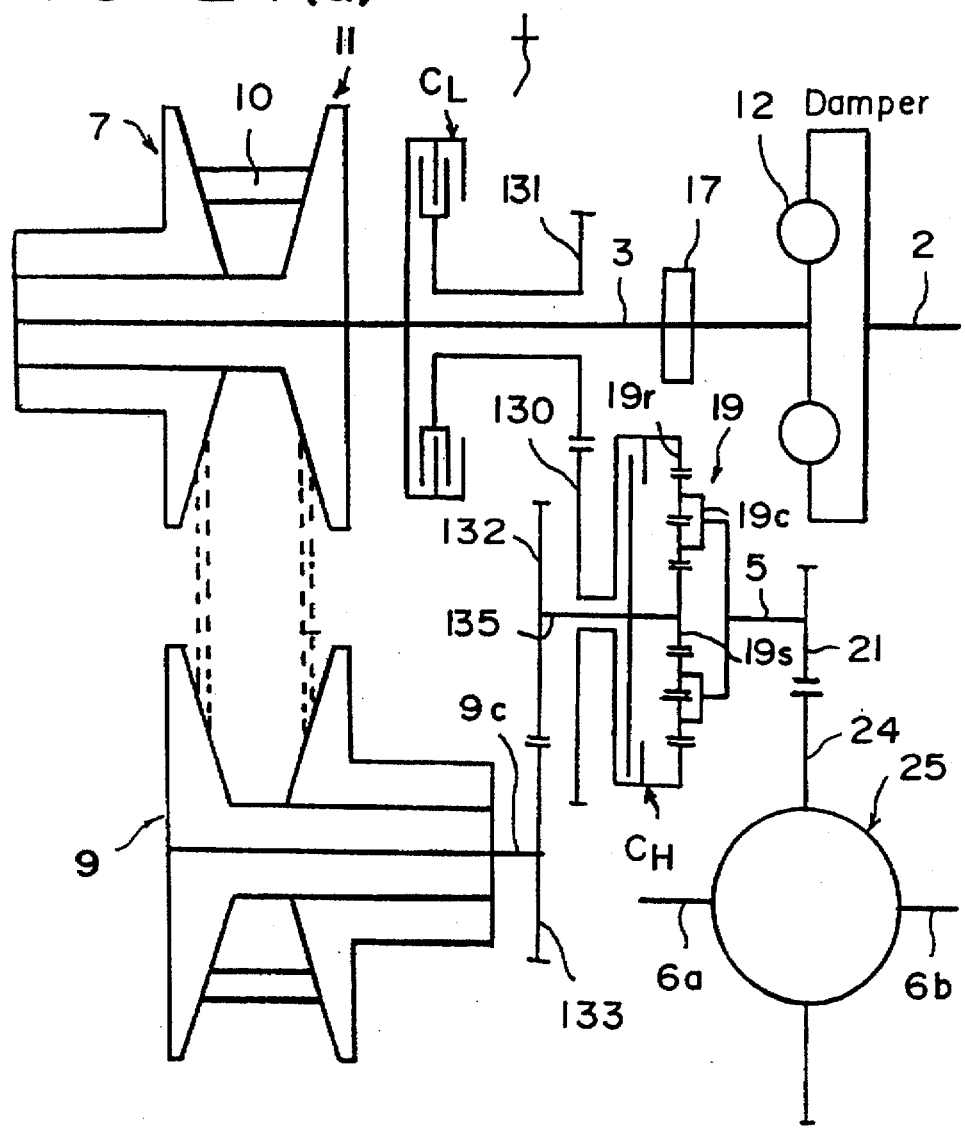
FIG. 24(a) is a skeletal diagram of another embodiment of a transmission system of the present invention.

FIG. 24 shows an embodiment using a dual pinion planetary gear unit 19. The ring gear 19r of the planetary gear unit can be coupled with the input shaft 3 through gears 130, 131 and the low clutch $C_L$ (first rotary element), the sun gear 19s thereof can be coupled with the secondary pulley 9 through gears 132, 133 (second rotary element), the carrier 19c thereof can be coupled with the output shaft 5 (third rotary element) and the ring gear 19r can be coupled with the sun gear 19s through the high clutch $C_H$. Then, the ring gear 19r and sun gear 19s are rotated in the same direction. Note that the third rotary element may be composed of the sun gear instead of the carrier and the first and second rotary elements may be composed of the carrier, the sun gear and the ring gear which do not serve as the third rotary element.

Figure 24B:
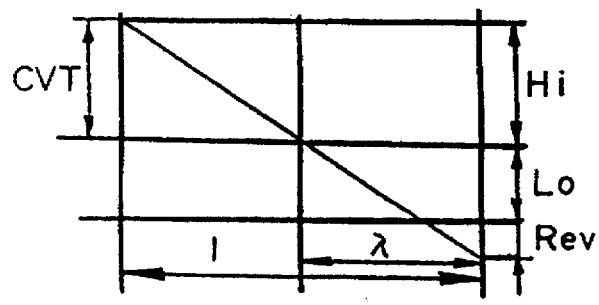
FIG. 24(b) is a speed graph for the embodiment of FIG. 24(a)

In this embodiment, the engine torque from the input shaft 3 is transmitted to the ring gear 19r of the planetary gear unit 19 through the low clutch $C_L$ and gears 131, 130 as well as to the sun gear 19s through the CVT unit 11 and gears 133, 132 in the low mode (Lo) as shown in the speed graph of FIG. 24(b). At this time, torque circulation is produced by the planetary gear unit 19 as in the above-described embodiment and an output from the carrier 19c to the output shaft 5 is in an increasing/decreasing direction opposite to that of the CVT unit 11 with the secondary pulley 9 serving as a driving side and the primary pulley 7 serving as a driven side in the CVT unit 11. Further, when the CVT unit 11 is in a predetermined speed increasing (O/D) state, the rotation of the carrier 19c is reversed, that is, made to rotate in the reverse (Rev) direction and the direction in which torque is transmitted from the CVT unit 11 is reversed. In addition, in the high mode (Hi), the engine torque from the output shaft 5 is transmitted to a shaft 135 through the CVT unit 11 and gears 133, 135 and the planetary gear 19 is integrally rotated by the engagement of the high clutch $C_H$ in the high mode, and thus the speed changing torque of the above shaft 135 is transmitted to the output shaft 5 as is through the CVT unit.

In the embodiment of FIG. 25, the sun gear 19s of a single pinion planetary gear 19 is coupled with the input shaft 3 through the chain 22 and the low clutch $C_L$ (first rotary element), the ring gear 19r thereof is coupled with the secondary pulley 9 through the gears 132, 133 (second rotary element) and the carrier 19c thereof is coupled with the differential gear unit 25 through the output shaft 5 and the gears 21, 24 (third rotary element). Then, the sun gear 19s and the carrier 19c are rotated in a reverse direction. Note that the first rotary element may be composed of the ring gear and the second rotary element may be composed of the sun gear.

In this embodiment, the engine rotation from the input shaft 3 is transmitted to the sun gear 19s of the planetary gear unit 19 through the low clutch $C_L$ and chain 22 as well as to the ring gear through the CVT unit 11 and gears 133, 132 and both the rotational inputs are combined and output at the output shaft 5 through the carrier 19c as shown in the speed graph of FIG. 25(b). At this time, torque circulation is produced as described above and the rotation is output from the output shaft 5 with positive to reverse change of its rotational direction.

Figure 26A:
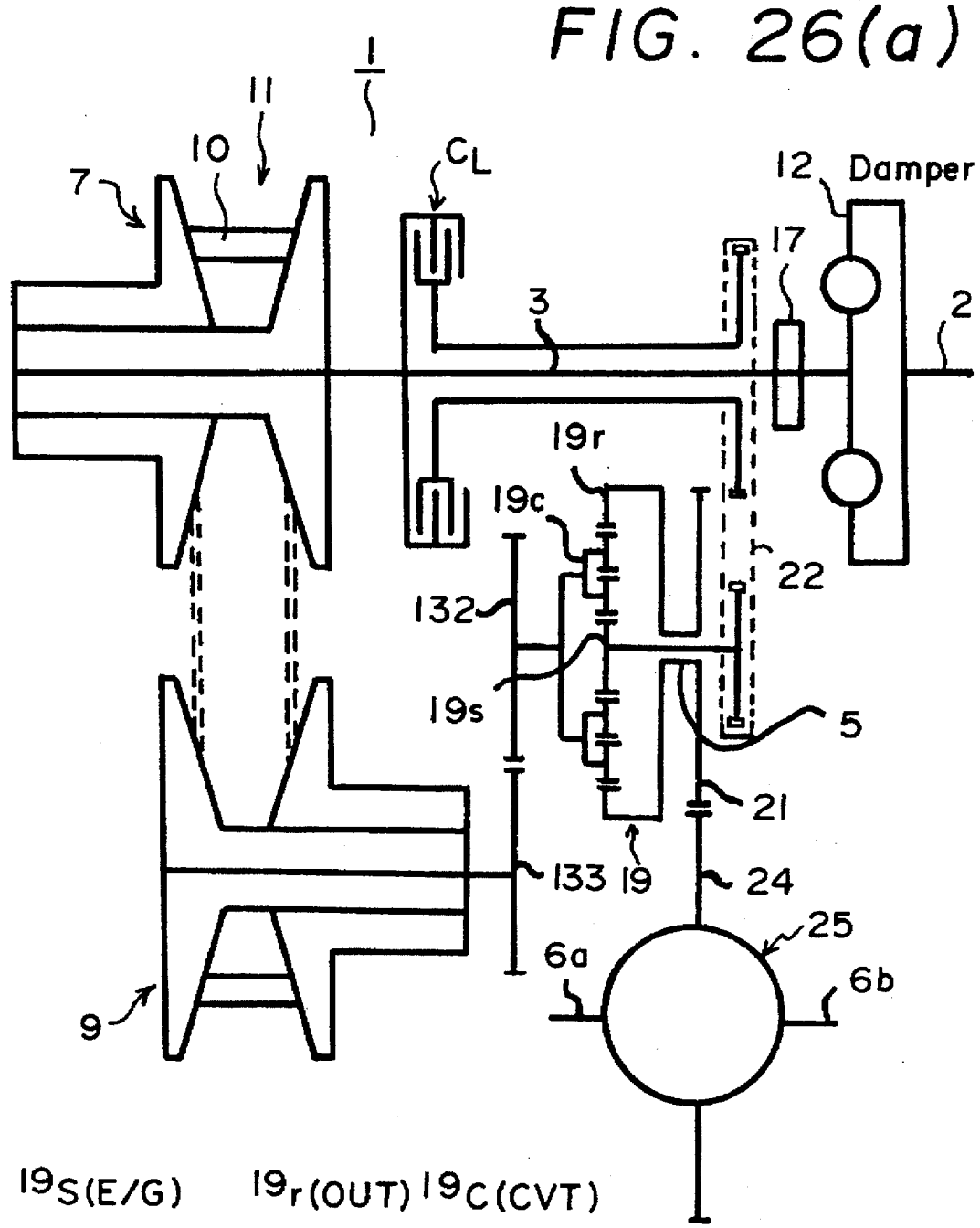
FIG. 26(a) is a skeletal diagram of a fourth embodiment of the transmission system of the present invention.
Figure 26B:
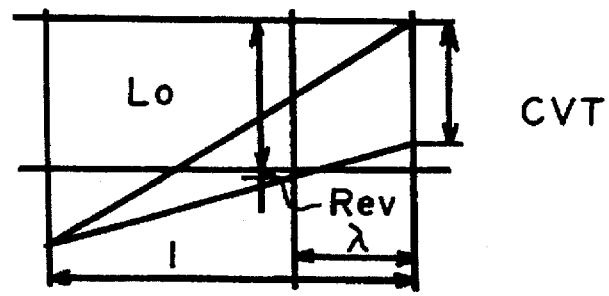
FIG. 26(b) is a speed graph for the embodiment of FIG. 26(a).

The embodiment of FIG. 26 is a dual pinion planetary gear unit 19 obtained by modification of the embodiment shown in FIG. 25. That is, the sun gear 19s of the dual pinion planetary gear 19 is coupled with the input shaft 3 through the chain 22 and low clutch $C_L$ (first rotary element), the carrier 19c thereof is coupled with the secondary pulley 9 through the gears 132, 133 (second rotary element), the ring gear 19r thereof is coupled with the differential gear unit 25 through the output shaft 5 and gears 21, 24 (third rotary element). Then, the sun gear 19s and carrier 19c are rotated in a reverse direction. Note that the first rotary element may be composed of the carrier and the second rotary element may be composed of the sun gear.

In this embodiment, the engine rotation from the input shaft 3 is transmitted to the sun gear 19s of the dual planetary gear 19 through the low clutch $C_L$ and chain 22 as well as to the carrier 19c through the CVT unit 11 and gears 133, 132. Both torque paths are then combined and output at the output shaft 5 through the carrier 19c as shown in the speed graph of FIG. 26(b). At this time, torque circulation is produced as described above and rotation is output at the output shaft 5 with forward to reverse change of its direction.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A continuously variable transmission system for speed change of rotation received from an engine output shaft and for transmitting that rotation, at the changed speed, to vehicle wheels, said system comprising:

an input shaft for receiving engine torque from the engine output shaft;

an output shaft for outputting torque to the vehicle wheels;

a belt type continuously variable transmission unit having a first pulley for receiving engine torque from said input shaft, a second pulley, a belt trained around both of said first and second pulleys and axial force actuating means for changing the pulley ratio of said first and second pulleys by applying axial forces to said first and second pulleys;

a planetary gear unit having a first rotary element rotatable with said input shaft, a second rotary element rotatable with said second pulley and a third rotary element rotatable with said output shaft;

selection means for selecting between forward travel wherein torque is transmitted from said second pulley to said first pulley with forward rotation output at said output shaft and reverse travel wherein torque is transmitted from said first pulley to said second pulley with reverse rotation output at said output shaft;

control means for controlling said axial force actuating means so that axial forces acting on said first and second pulleys produce a difference corresponding to the pulley ratio of said first and second pulleys; and switching means, responsive to operation of said selection means selecting between said forward travel and said reverse travel, for reversing relative magnitudes of the axial forces acting on said first and second pulleys, under control of said control means, thereby switching between said forward travel and said reverse travel.

2. A continuously variable transmission according to claim 1, wherein: said axial force actuating means comprises a first hydraulic servo acting on said first pulley and a second hydraulic servo acting on said second pulley and means for supplying different hydraulic pressures derived from a pressure received from an oil pump to said first and second hydraulic servos to generate said axial forces; and wherein said switching means is a switching valve for switching the hydraulic pressures between said first hydraulic servo and said second hydraulic servo.

3. A continuously variable transmission according to claim 2, wherein said switching valve is a manual valve integral with said selection means.

4. A continuously variable transmission according to claim 2 wherein: each of said first and second hydraulic servos has a plurality of hydraulic chambers; and wherein said switching valve selectively switches feed of said different hydraulic pressures between said hydraulic chambers to thereby reverse the effective pressure-receiving areas of said first and second hydraulic servos.

5. A continuously variable transmission according to claim 4, wherein each of said first and second hydraulic servos has at least a first hydraulic chamber and a second hydraulic chamber, respectively, and said the first hydraulic chambers of both of said hydraulic servos have the same effective pressure-receiving areas; wherein said control means comprises a regulator valve for continuously feeding a first hydraulic pressure to the first hydraulic chambers of both of said hydraulic servos and a ratio control valve for feeding a second hydraulic pressure to the second hydraulic chamber of a selected one of said hydraulic servos; and wherein said switching valve reverses the feed of the second hydraulic pressure from said ratio control valve between said second hydraulic chambers.

6. A continuously variable transmission according to claim 5, wherein said regulator valve and said ratio control valve are interposed between the oil pump and said switching valve.

7. A continuously variable transmission according to claim 2 wherein: said control means comprises first and second regulator valves for adjusting the hydraulic pressure from said oil pump to generate first and second hydraulic pressures, respectively, and for feeding said first hydraulic pressure to one of said first and second hydraulic servos and said second hydraulic pressure to the other of said first and second hydraulic servos, and wherein said switching valve reverses the feed of said first and second hydraulic pressures between said first and second hydraulic servos.

8. A continuously variable transmission according to claim 7, wherein said first and second regulator valves are interposed between the oil pump and said switching valve.

9. A continuously variable transmission according to claim 2, further comprising means for determining if the vehicle is in a coasting state and a relief valve for reducing the hydraulic pressure of the one of said first and second hydraulic servos on which a higher hydraulic pressure had been acting to lower than that of the hydraulic pressure of the other of said first and second hydraulic servos, responsive to a determination that the vehicle is in a coasting state.

10. A continuously variable transmission according to claim 1, wherein said input shaft is coupled with said first pulley and said first rotary element, so that the direction of torque transmitted from said first pulley through the input shaft is the opposite of the direction in which torque is transmitted from said first rotary element through the input shaft.

* * * * *